United States Patent
Higuchi et al.

(10) Patent No.: US 8,374,162 B2
(45) Date of Patent: Feb. 12, 2013

(54) TRANSMISSION DEVICE AND TRANSMISSION METHOD

(75) Inventors: Kenichi Higuchi, Yokohama (JP);
Yoshihisa Kishiyama, Yokosuka (JP);
Yoshiaki Ofuji, Yokohama (JP); Satoshi Nagata, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 205 days.

(21) Appl. No.: 12/278,718

(22) PCT Filed: Feb. 5, 2007

(86) PCT No.: PCT/JP2007/051921
§ 371 (c)(1),
(2), (4) Date: Dec. 9, 2008

(87) PCT Pub. No.: WO2007/091519
PCT Pub. Date: Aug. 16, 2007

(65) Prior Publication Data
US 2009/0129362 A1 May 21, 2009

(30) Foreign Application Priority Data

Feb. 8, 2006 (JP) ................................. 2006-031742
Mar. 20, 2006 (JP) ................................. 2006-077820
Jun. 19, 2006 (JP) ................................. 2006-169449

(51) Int. Cl.
*H04B 7/216* (2006.01)
*H04J 1/00* (2006.01)
*H04J 3/00* (2006.01)
*H04L 27/28* (2006.01)

(52) U.S. Cl. ......... 370/343; 370/342; 370/345; 375/260

(58) Field of Classification Search .......... 370/329–330, 370/335–338, 340–349, 431, 441–443, 458–460; 455/507, 509–517
See application file for complete search history.

(56) References Cited

U.S. PATENT DOCUMENTS

| | | | |
|---|---|---|---|
| 2004/0114552 A1* | 6/2004 | Lim et al. | 370/324 |
| 2004/0190482 A1* | 9/2004 | Baum et al. | 370/347 |
| 2005/0122928 A1* | 6/2005 | Vijayan et al. | 370/312 |
| 2005/0190715 A1* | 9/2005 | McNamara | 370/319 |
| 2006/0045001 A1* | 3/2006 | Jalali | 370/208 |
| 2006/0050664 A1* | 3/2006 | Guey | 370/329 |

(Continued)

FOREIGN PATENT DOCUMENTS

WO 02/093782 A1 11/2002

OTHER PUBLICATIONS

Japanese Office Action for Application No. 2006-169449, mailed on May 14, 2009 (6 pages).

(Continued)

*Primary Examiner* — Thai Hoang
(74) *Attorney, Agent, or Firm* — Osha Liang LLP

(57) ABSTRACT

A disclosed transmission device includes a frequency scheduling unit configured to allocate, to each user, either frequency blocks that are consecutive frequency subcarrier blocks obtained by dividing a system bandwidth or distributed frequency blocks that are frequency subcarrier blocks discretely distributed in the system bandwidth; and a mapping unit configured to assign transmission data to the frequency blocks or the distributed frequency blocks according to the allocation result. The frequency scheduling unit is configured to allocate the distributed frequency blocks using the frequency blocks as units and to allocate sub-blocks obtained by dividing the respective distributed frequency blocks.

15 Claims, 37 Drawing Sheets

U.S. PATENT DOCUMENTS

| | | | |
|---|---|---|---|
| 2006/0072604 A1* | 4/2006 | Sutivong et al. | 370/437 |
| 2006/0209754 A1* | 9/2006 | Ji et al. | 370/329 |
| 2006/0223449 A1* | 10/2006 | Sampath et al. | 455/69 |
| 2006/0293076 A1* | 12/2006 | Julian et al. | 455/522 |
| 2007/0019596 A1* | 1/2007 | Barriac et al. | 370/338 |
| 2007/0064669 A1* | 3/2007 | Classon et al. | 370/347 |
| 2007/0097908 A1* | 5/2007 | Khandekar et al. | 370/329 |
| 2007/0097942 A1* | 5/2007 | Gorokhov et al. | 370/342 |
| 2007/0173260 A1* | 7/2007 | Love et al. | 455/450 |
| 2008/0298335 A1* | 12/2008 | Lee | 370/342 |

OTHER PUBLICATIONS

TSG-RAN WG1 #45, R1-061308, NEC Group, "Resource Allocation Signalling for E-ULTRA", May 2006, 14 pages.

International Search Report (English & Japanese) for PCT/JP2007/051921 mailed May 15, 2007 (9 pages).

Written Opinion of ISA (Japanese only) mailed May 15, 2007 (3 pages).

3GPP TSG RAN WG1 Meeting #44bis, R1-060896, Mar. 31, 2006, Nortel, "Performance comparison between Diversity Physical Resource Block (PRB) and Localised PRB" (9 pages).

3GPP TSG RAN WG1 meeting #45; Tdoc R1-061484, May 12, 2006, Philips, "Distributed transmission in E-UTRA downlink" (5 pages).

3GPP TSG RAN1 #44, R1-060396, Feb. 17, 2006, Motorla, "Downlink Localized and Distributed Multiplexing" (3 pages).

3GPP RAN WG1 #45, R1-061334, May 12, 2006, Samsung, "System throughput of DL localized transmission with existence of distributed transmission" (5 pages).

3GPP TSG RAN WG1 LTE Ad Hoc Meeting, R1-060038, Jan. 25, 2006, NTT DoCoMo, Mitsubishi Electric Corporation, NEC, Sharp; "Distributed OFDMA Transmission for Shared Data Channel in E-UTRA Downlink" (10 pages).

3GPP TSG RAN WG1 AH on LTE, R1-060052, Jan. 25, 2006, LG Electronics, "Downlink resource allocation in EUTRA" (5 pages).

Russian Office Action for Application No. 2008134857/09, mailed on Aug. 17, 2010 (10 pages).

\* cited by examiner

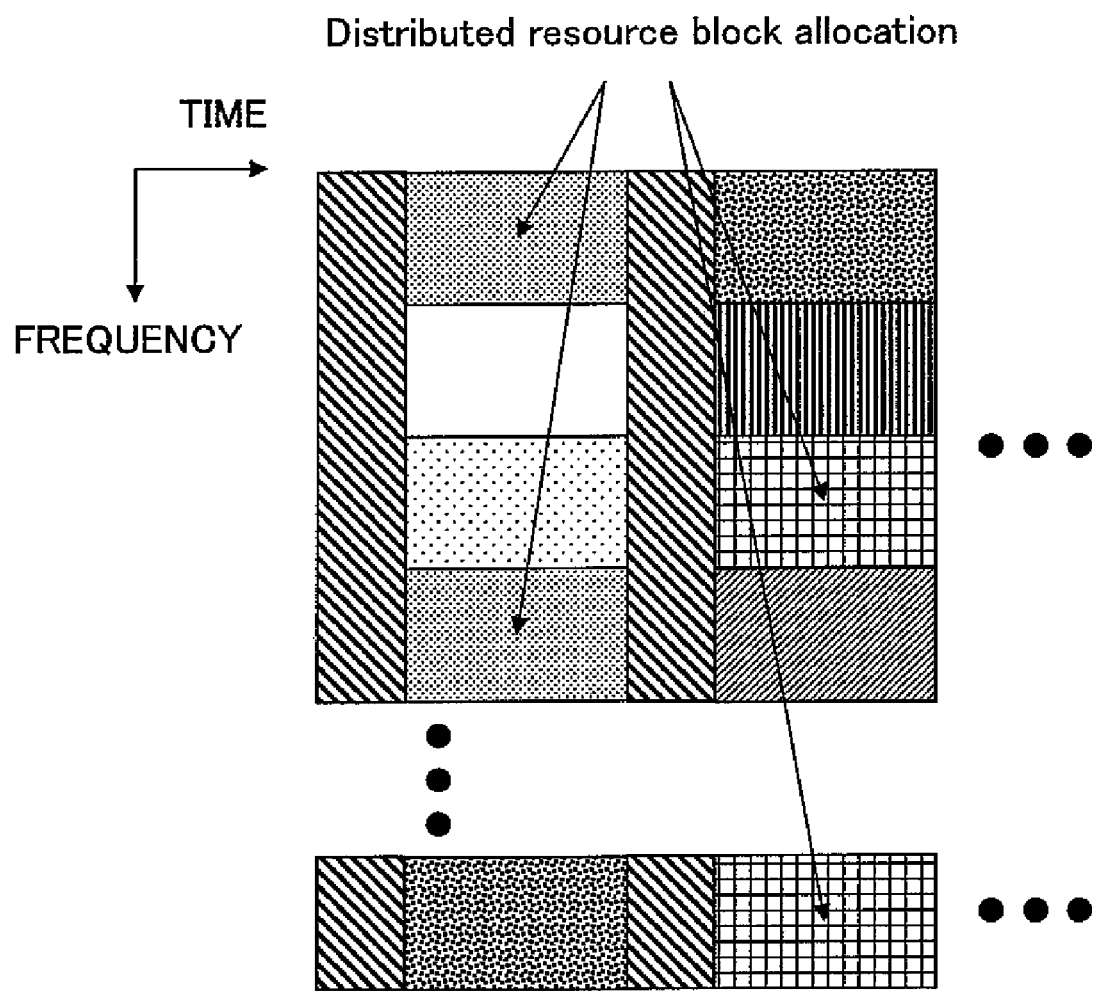

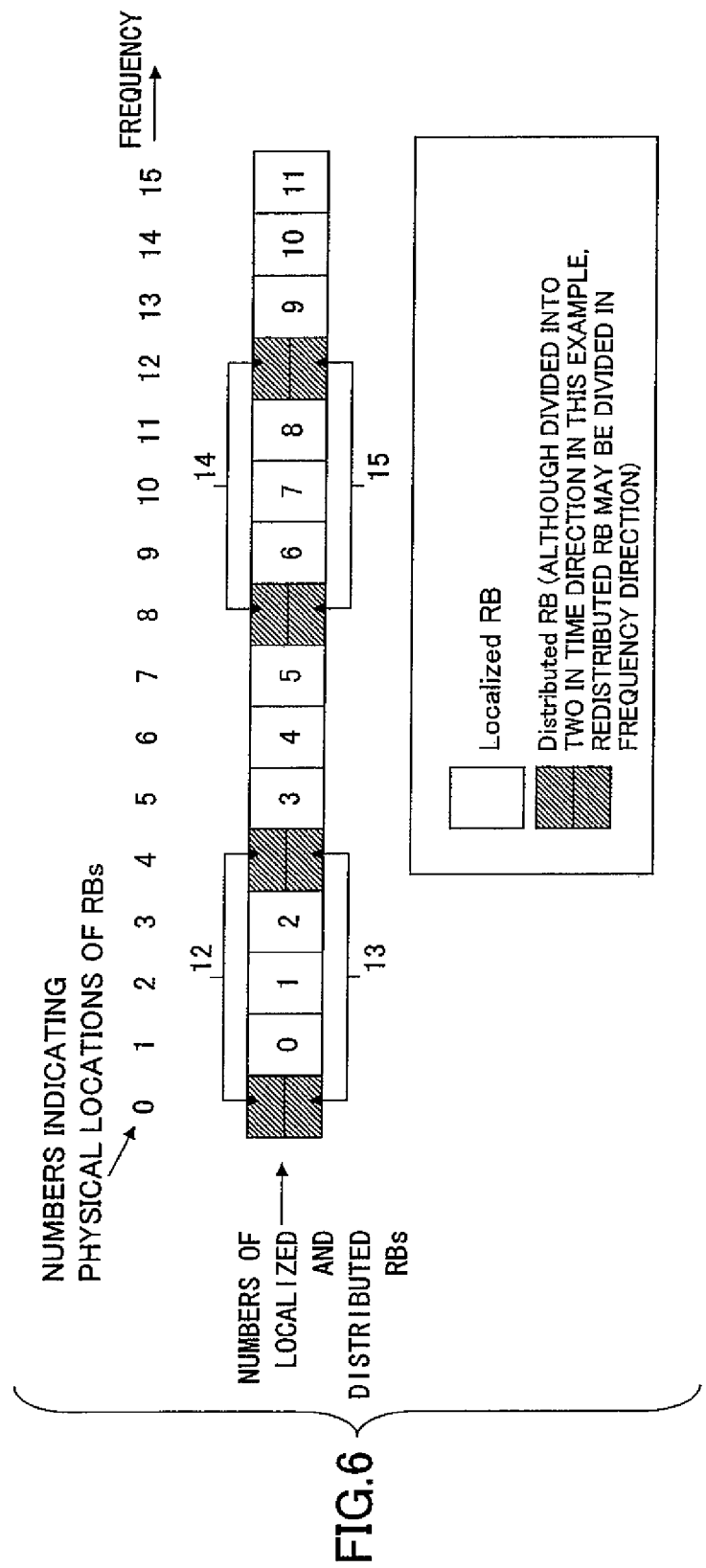

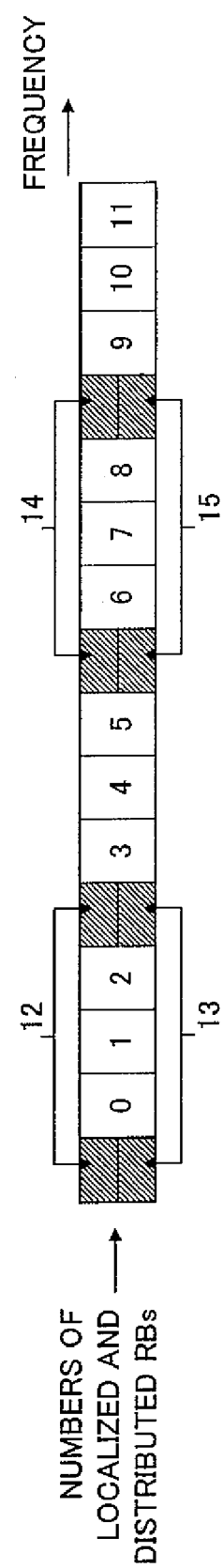

FIG.8

| NUMBER OF DISTRIBUTED RBs | UE IDs | | | | UE NUMBERS ASSOCIATED WITH ALLOCATED RB NUMBERS | | |
|---|---|---|---|---|---|---|---|
| | #0 | #1 | #2 | #3 | #0 | #1 | ...... #15 |

FIG.9

| NUMBER OF DISTRIBUTED RBs | UE ID | UE NUMBER ASSOCIATED WITH ALLOCATED RB NUMBERS | | |
|---|---|---|---|---|
| | | #0 | #1 | ---- #15 |

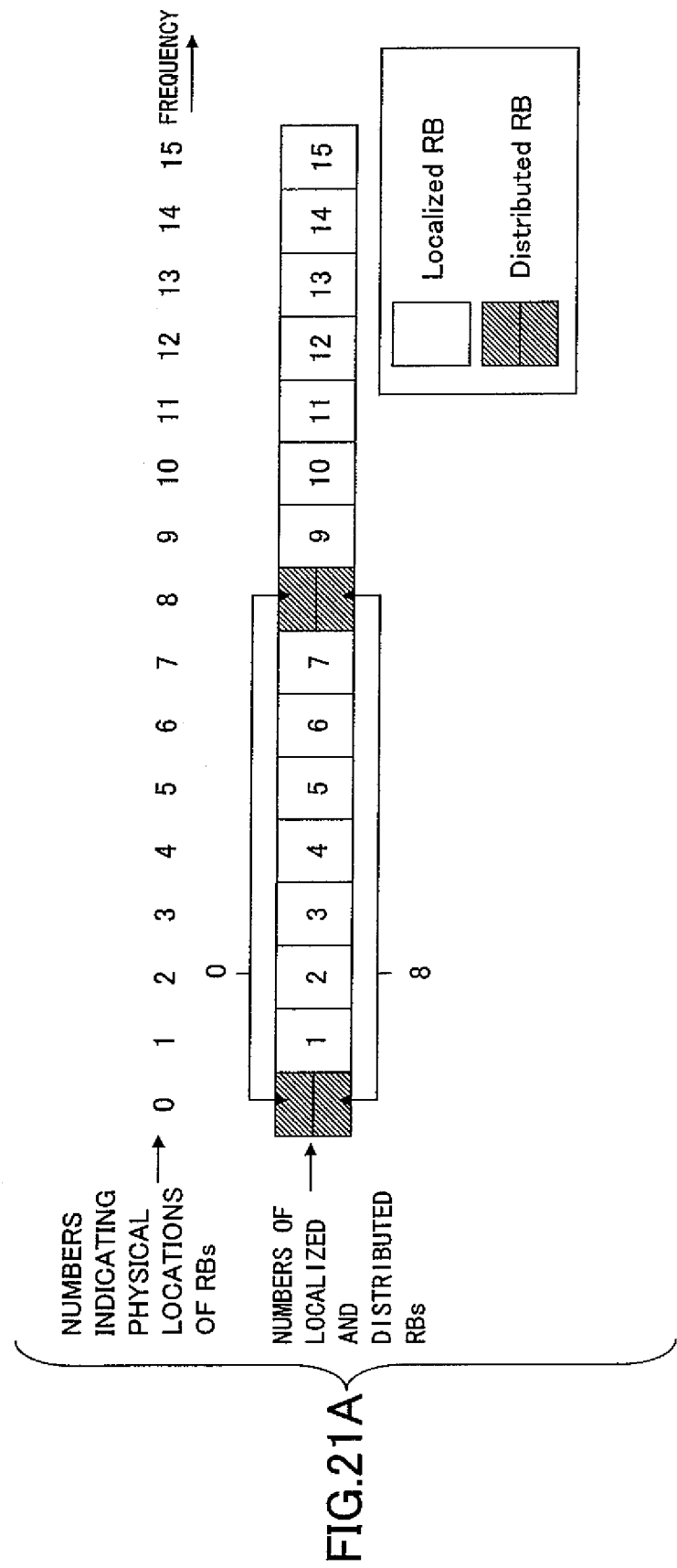

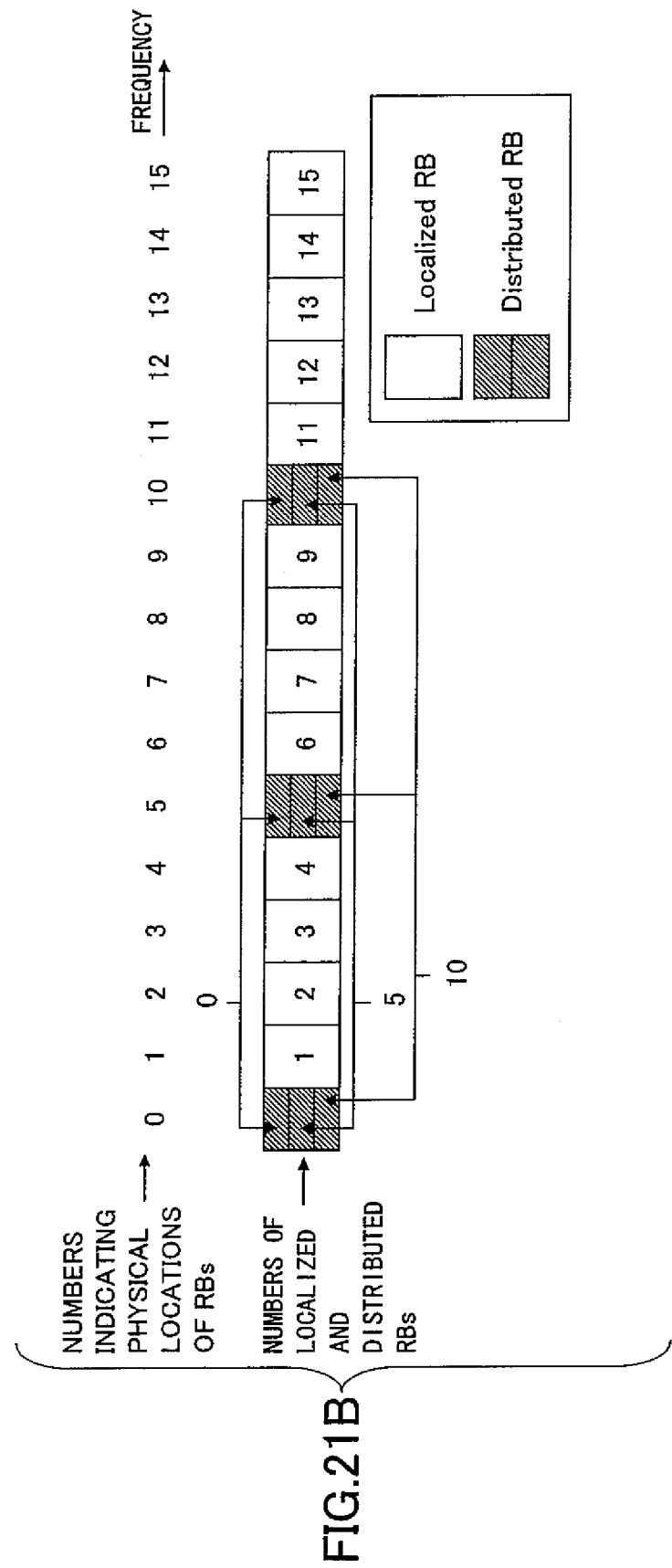

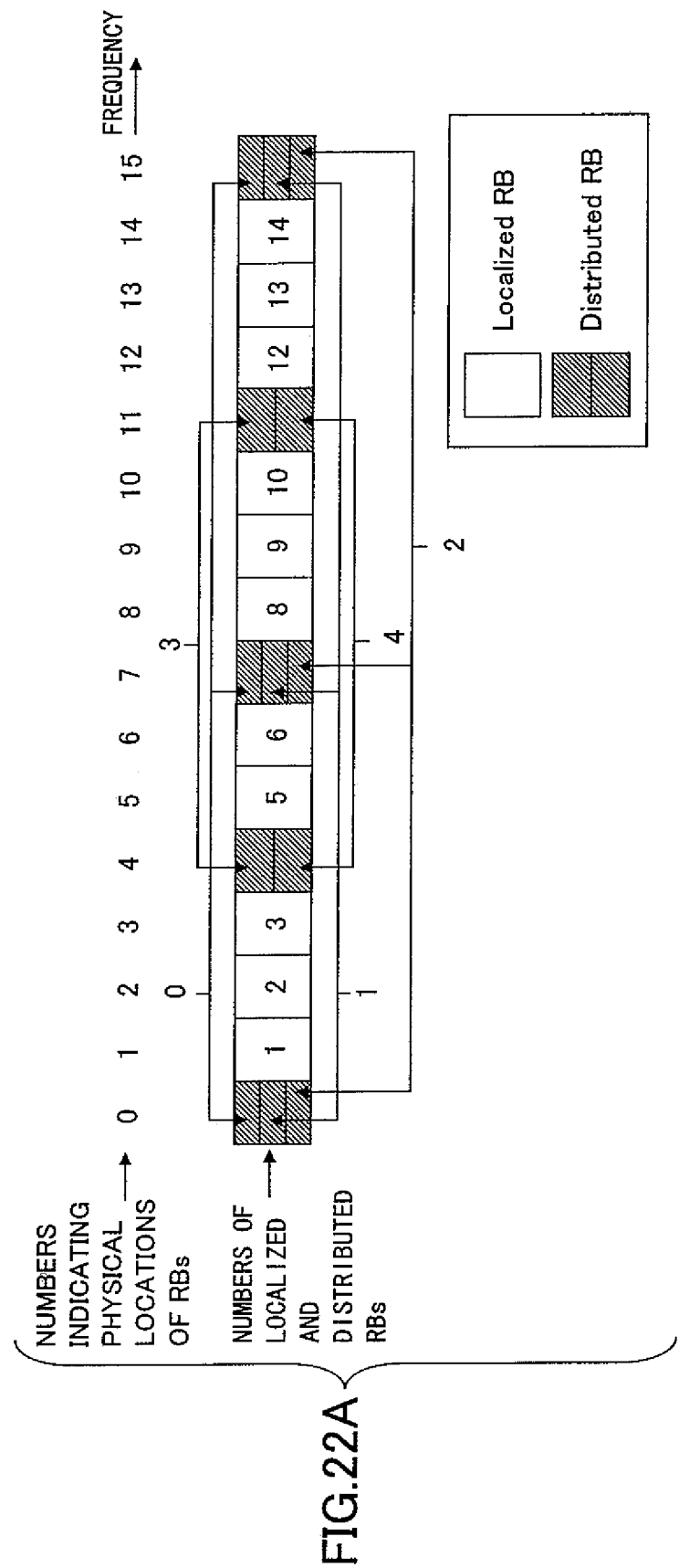

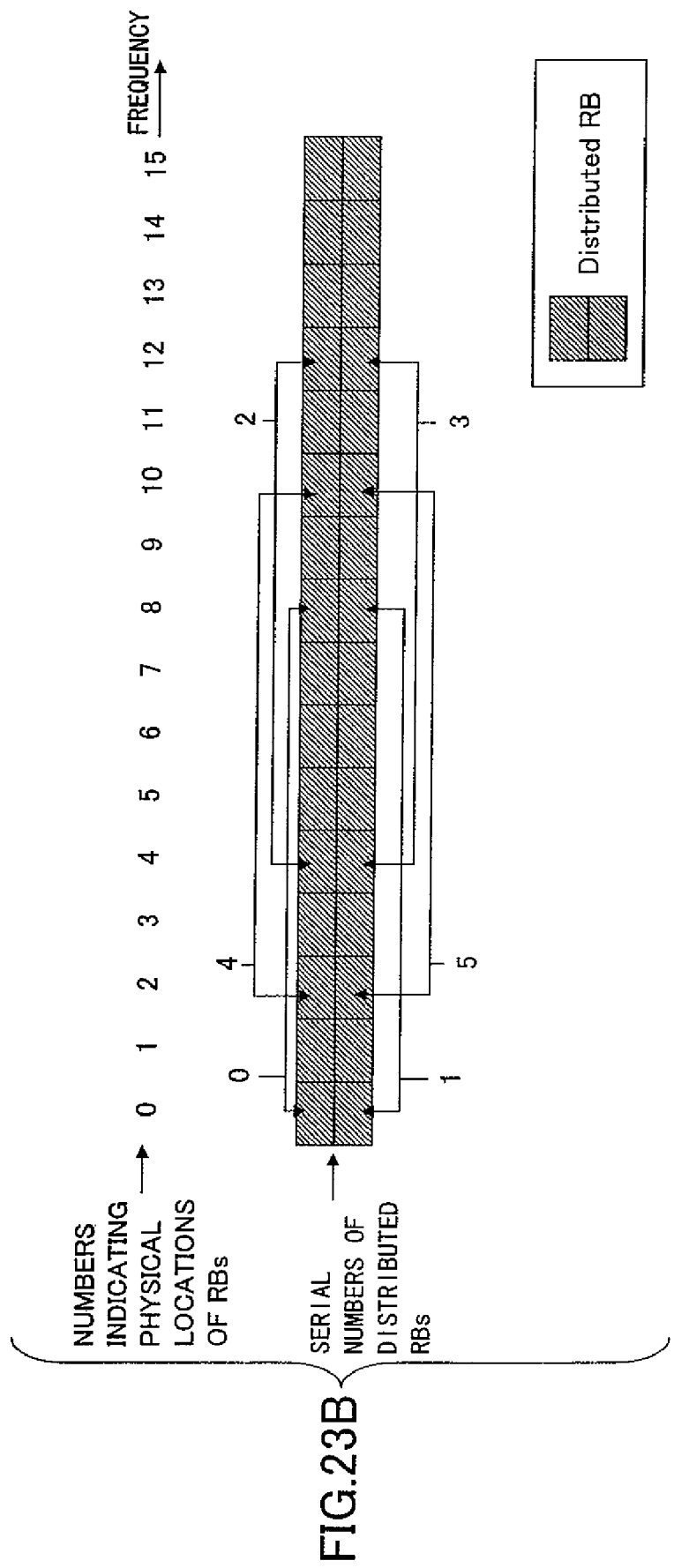

TRANSMISSION DEVICE AND TRANSMISSION METHOD

TECHNICAL FIELD

The present invention generally relates to a transmission device and a transmission method.

BACKGROUND ART

Transmission methods for a downlink data channel include localized transmission and distributed transmission.

In localized transmission, as shown in FIG. 1A, frequency resources are allocated to the respective users by frequency blocks. For example, in localized transmission, frequency blocks are allocated in such a manner that frequency selective fading is reduced. Generally, transmission data sizes in localized transmission are large, and therefore localized transmission is suitable to achieve the effect of frequency scheduling.

As shown in FIG. 1B, in distributed transmission, transmission data are distributed across an allocated frequency band regardless of frequency blocks. For example, distributed transmission is employed when frequency scheduling is not usable because users are moving at high speed or when transmission data sizes are small as in VoIP. Generally, transmission data sizes in distributed transmission are small, and therefore distributed transmission is suitable to achieve frequency diversity gain.

DISCLOSURE OF INVENTION

Problems to be Solved by the Invention

However, the above background art technologies have disadvantages as described below.

Generally, a system has to support communications of users moving both at low speed and high speed.

Also, a system has to support both packets with large data sizes as in Web browsing and packets with small data sizes as in VoIP.

Embodiments of the present invention make it possible to solve or reduce one or more problems caused by the limitations and disadvantages of the background art, and provide a transmission device and a transmission method that enable a system to support both localized transmission and distributed transmission.

Means for Solving the Problems

An embodiment of the present invention provides a transmission device including a frequency scheduling unit configured to allocate, to each user, either frequency blocks that are consecutive frequency subcarrier blocks obtained by dividing a system bandwidth or distributed frequency blocks that are frequency subcarrier blocks discretely distributed in the system bandwidth; and a mapping unit configured to assign transmission data to the frequency blocks or the distributed frequency blocks according to the allocation result. The frequency scheduling unit is configured to allocate the distributed frequency blocks using the frequency blocks as units and to allocate sub-blocks obtained by dividing the respective distributed frequency blocks.

This configuration makes it possible to assign a packet that normally fits in one distributed frequency block to multiple sub-blocks.

Another embodiment of the present inventions provides a transmission method where either frequency blocks that are consecutive frequency subcarrier blocks obtained by dividing a system bandwidth or distributed frequency blocks that are frequency subcarrier blocks discretely distributed in the system bandwidth are allocated to each user. The transmission method includes a sub-block allocating step of allocating sub-blocks obtained by dividing the respective distributed frequency blocks that are allocated using the frequency blocks as units; and a mapping step of assigning transmission data to the frequency blocks or the distributed frequency blocks that are allocated.

This method makes it possible to assign a packet that normally fits in one distributed frequency block to multiple sub-blocks.

Advantageous Effect of the Invention

Embodiments of the present invention provide a transmission device and a transmission method that enable a system to support both localized transmission and distributed transmission.

BRIEF DESCRIPTION OF THE DRAWINGS

FIG. 3 is a drawing used to describe operations of a transmission device according to an embodiment of the present invention;

FIG. 6 is a drawing illustrating a method of reporting allocation information in localized and distributed multiplexing;

FIG. 7A is a drawing illustrating a method of reporting allocation information in localized and distributed multiplexing;

FIG. 8 is a drawing illustrating a method of reporting allocation information in localized and distributed multiplexing;

FIG. 9 is a drawing illustrating a method of reporting allocation information in localized and distributed multiplexing;

FIG. 21A is a drawing used to describe operations of a frequency scheduling unit of a transmission device according to an embodiment of the present invention;

FIG. 21B is a drawing used to describe operations of a frequency scheduling unit of a transmission device according to an embodiment of the present invention;

FIG. 22A is a drawing used to describe operations of a frequency scheduling unit of a transmission device according to an embodiment of the present invention;

FIG. 23B is a drawing used to describe operations of a frequency scheduling unit of a transmission device according to an embodiment of the present invention;

EXPLANATION OF REFERENCES

100 Transmission device

BEST MODE FOR CARRYING OUT THE INVENTION

Figure 1A:
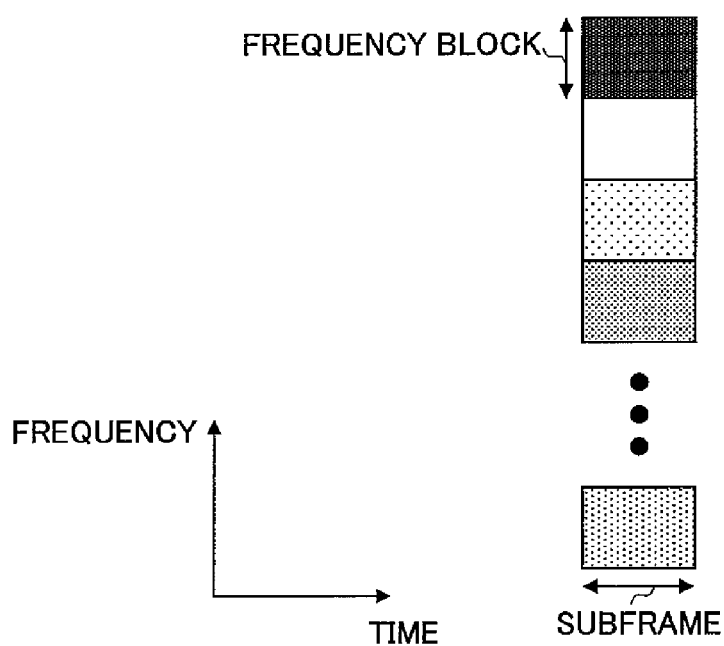
FIG. 1A is a drawing illustrating localized transmission.
Figure 1B:
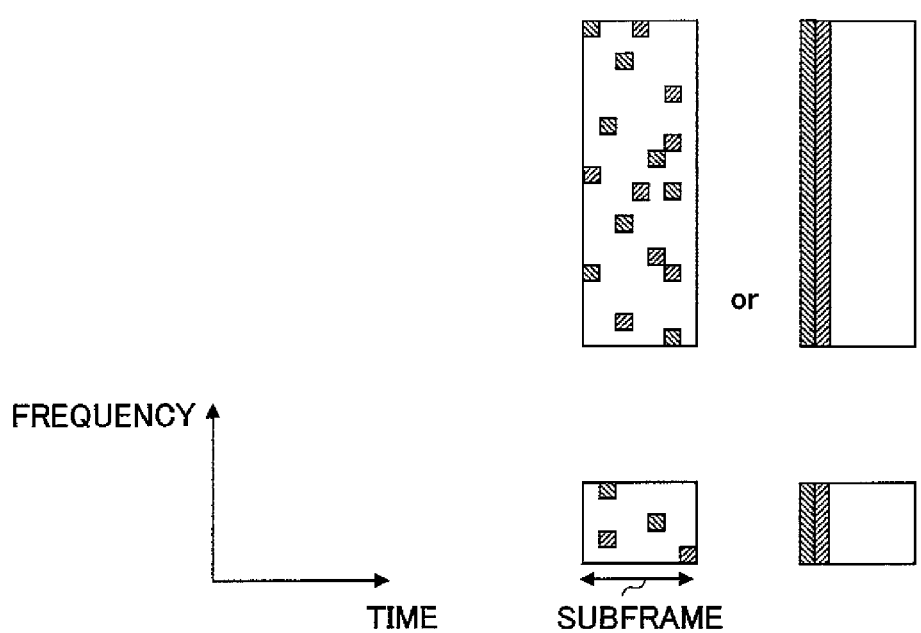
FIG. 1B is a drawing illustrating distributed transmission.

The best mode for carrying out the invention is described based on the following embodiments with reference to the accompanying drawings.

Throughout the accompanying drawings, the same reference numbers are used for parts having the same functions, and overlapping descriptions of those parts are omitted.

A transmission device according to an embodiment of the present invention is described below with reference to FIG. 2.

A transmission device 100 of this embodiment performs distributed transmission based on localized transmission. The transmission device 100 is provided, for example, in a base station.

The transmission device 100 includes a resource block (RB) allocation ratio switching unit 102 used as an allocation ratio determining unit that receives information on the mobility of mobile stations (UEs) and information, such as sizes and types, on the traffic of the mobile stations; a frequency scheduling unit 104 that receives propagation path information of the mobile stations, priority information of the mobile stations, and an output signal from the resource block allocation ratio changing unit 102; a control information generating unit 106 and a transmission data generating unit 112 each of which receives an output signal from the frequency scheduling unit 104; coding-rate-and-data-modulation determining units 108 and 114 that, respectively, receive output signals from the control information generating unit 106 and the transmission data generating unit 112; a mapping unit 110 that receives an output signal from the coding-rate-and-data-modulation determining unit 108 and outputs control information; and a mapping unit 116 that receives data and an output signal from the coding-rate-and-data-modulation determining unit 114 and outputs data.

The resource block allocation ratio changing unit 102 determines the allocation ratio of resource blocks to be allocated for localized transmission (localized resource blocks) to those to be allocated for distributed transmission (distributed resource blocks) based on the mobility information and traffic information of the mobile stations, and inputs the determined-allocation ratio as resource block allocation ratio information to the frequency scheduling unit 104.

For example, when there are many high mobility mobile stations or when the data sizes of packets in the traffic are small as in VoIP, the resource block allocation ratio changing unit 102 allocates a larger share of resource blocks for distributed transmission.

The frequency scheduling unit 104 allocates resource blocks to the mobile stations based on the propagation path information of the mobile stations, the priority information of the mobile stations, and the resource block allocation ratio information. In this embodiment, the priority information of each mobile station is represented by a numerical value obtained based on parameters such as the presence or absence of a retransmission request, time elapsed after a packet is transmitted from a transmitting terminal, a target transmission rate, actual throughput, and an allowed delay in packet transmission.

For example, the frequency scheduling unit 104 adaptively changes the allocation ratio of localized resource blocks to distributed resource blocks at predetermined intervals, e.g., at each scheduling cycle, according to the resource block allocation ratio information determined based on the conditions, such as channel conditions and traffic, of the mobile stations. This approach makes it possible to increase the throughput of data channels.

Alternatively, the frequency scheduling unit 104 may be configured to change the allocation ratio of localized resource blocks to distributed resource blocks at long intervals according to the resource block allocation ratio information determined based on the conditions, such as traffic, of the mobile stations. Compared with a case where the ratio is changed at each scheduling cycle, this approach makes it easier to control resource block allocation. Also, this approach makes it possible to reduce the number of control bits used to report the number of resource blocks allocated for distributed transmission.

For example, as shown in FIG. 3, the frequency scheduling unit 104 assigns data to be sent by localized transmission and data to be sent by distributed transmission to frequency blocks. In other words, the frequency scheduling unit 104 allocates distributed frequency blocks (resource blocks) that are frequency subcarrier blocks discretely distributed in a system bandwidth to each user using frequency blocks, which are consecutive frequency subcarrier blocks obtained by dividing the system bandwidth, as units. This approach makes it unnecessary to use signaling information in distributed transmission.

Also, the frequency scheduling unit 104 divides one resource block into multiple sub-blocks, e.g., into N sub-blocks (N represents an integer greater than 0), to perform distributed transmission at resource block level. In this case, the frequency scheduling unit 104 allocates sub-blocks obtained by dividing respective distributed frequency blocks as resource blocks. Here, resource blocks indicate units for mapping users or units for assigning users.

Figure 4A:
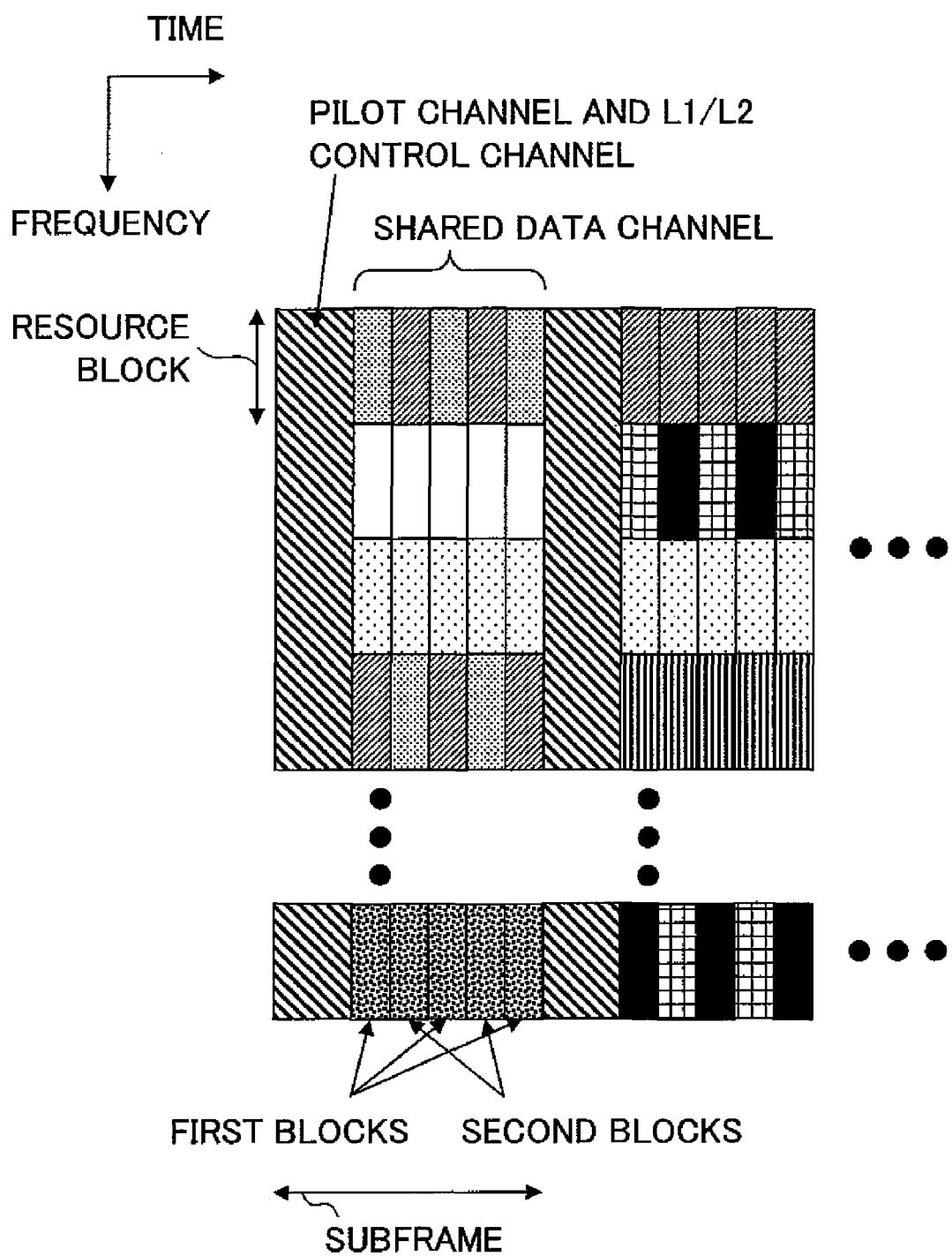
FIG. 4A is a drawing used to describe operations of a transmission device according to an embodiment of the present invention.

For example, as shown in FIG. 4A, the frequency scheduling unit 104 divides a resource block in the time direction, e.g., into two and allocates the divided resource blocks to multiple users, e.g., to two users. In the example shown in FIG. 4A, the frequency scheduling unit 104 allocates first blocks and second blocks to different users.

Figure 4B:
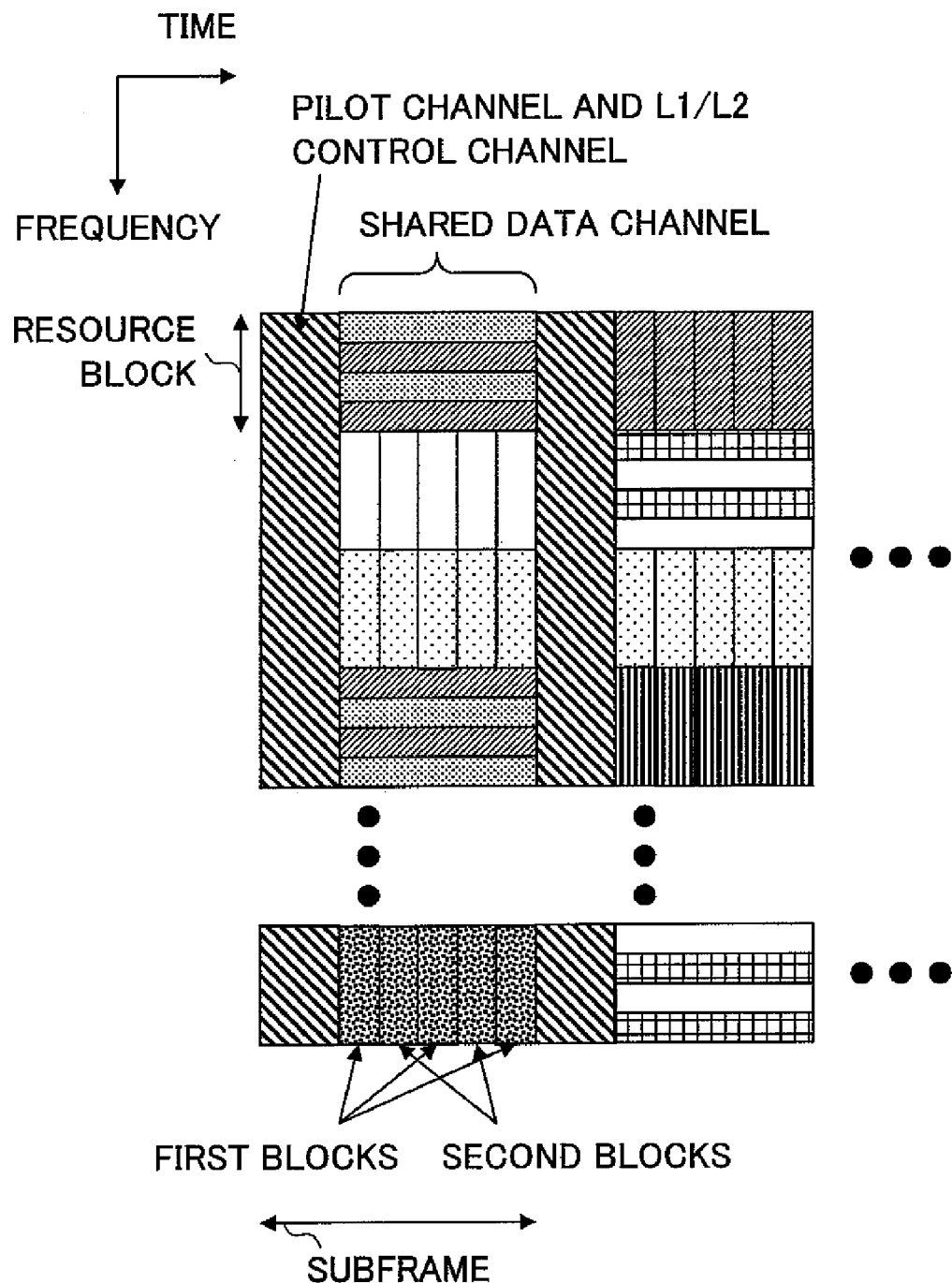
FIG. 4B is a drawing used to describe operations of a transmission device according to an embodiment of the present invention.

Alternatively, the frequency scheduling unit 104 may be configured to divide a resource block in the frequency direction, e.g., into two as shown in FIG. 4B, and to allocate the divided resource blocks to multiple users, e.g., to two users. In the example shown in FIG. 4B, the frequency scheduling unit 104 allocates first blocks and second blocks to different users.

In FIGS. 4A and 4B, the first two symbols represent a pilot and signaling bits, i.e., a pilot channel and an L1/L2 control channel.

In distributed transmission at resource block level, frequency diversity gain cannot be achieved unless multiple resource blocks are allocated. When the data size of a packet is small as in VoIP traffic, all data may fit in one resource block and frequency diversity gain may not be achieved. In VoIP, the data size of a packet is, for example, 180 bits.

Dividing a resource block into N resource blocks and assigning a packet that normally fits in one resource block to the N resource blocks make it possible to increase frequency diversity gain.

The control information generating unit 106 generates control information for the mobile stations to which resource blocks are allocated by the frequency scheduling unit 104.

Figure 5:
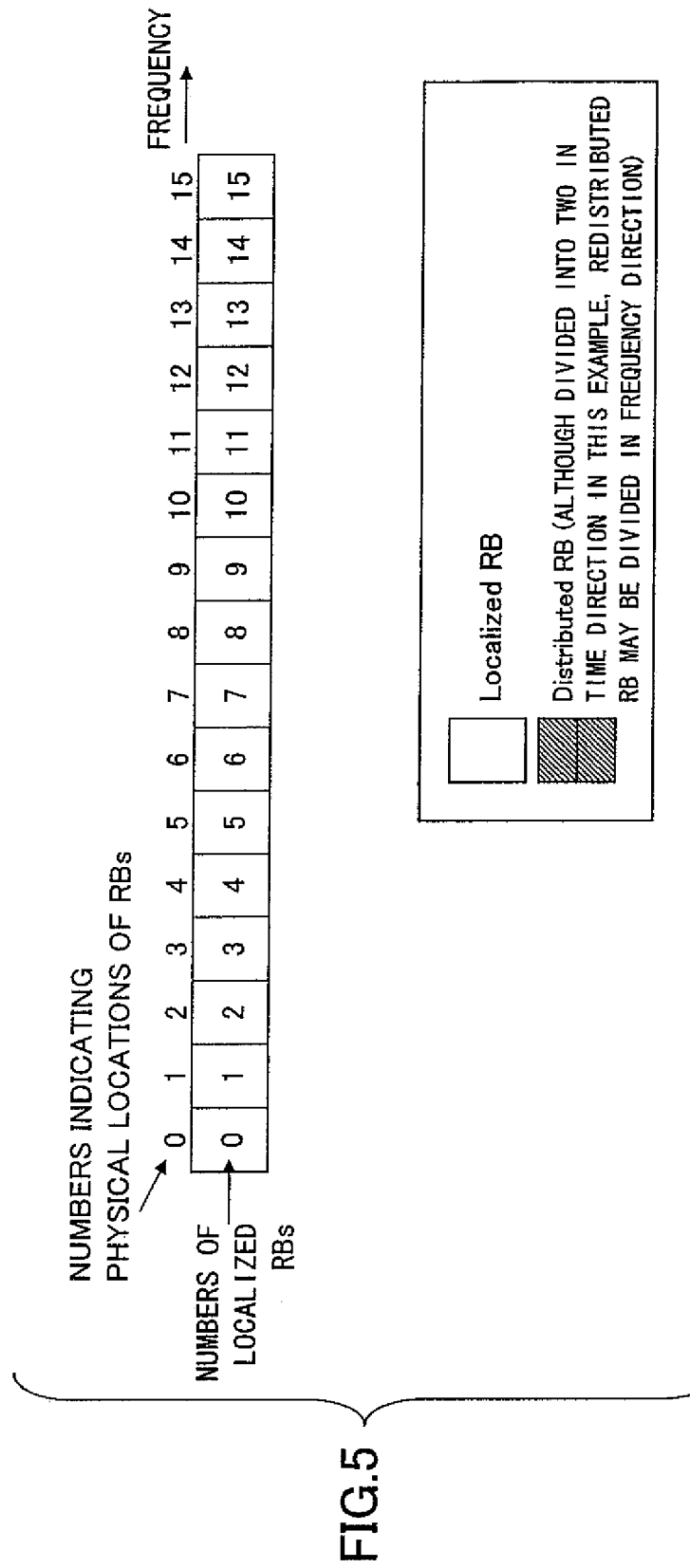
FIG. 5 is a drawing illustrating a method of reporting allocation information in localized and distributed multiplexing.

The control information generating unit 106 assigns identification codes, for example, numbers, indicating physical locations of resource blocks to the numbers of localized resource blocks. For example, as shown in FIG. 5, when there are 16 resource blocks in a frequency band and all the resource blocks are used as localized resource blocks, the numbers of the localized resource blocks and the numbers indicating physical locations of the resource blocks become identical. In FIG. 5, numbers written in localized RBs represent the numbers assigned to the localized resource blocks and numbers written above the localized RBs represent physical locations of the resource blocks.

When distributed transmission is performed, the control information generating unit 106 converts a subset of the resource blocks into distributed resource blocks. For example, the control information generating unit 106 converts four resource blocks into distributed resource blocks. In this embodiment, localized resource blocks that are to be converted into distributed resource blocks are selected according to a predetermined rule depending on the number of distributed resource blocks.

For example, as shown in FIG. 6, the control information generating unit 106 assigns identification codes or numbers starting from 0 indicating the corresponding physical locations to the resource blocks and converts every 16/N-th (N indicates the number of distributed resource blocks to be allocated) resource block to a distributed resource block. This approach makes it possible to uniquely determine resource blocks to be allocated for distributed transmission based on the number of distributed resource blocks and thereby to reduce the amount of control information. In FIG. 6, numbers written in localized RBs and beside distributed RBs, respectively, represent the numbers assigned to localized resource blocks and distributed resource blocks, and numbers written above the RBs represent physical locations of the resource blocks.

The control information generating unit 106 assigns serial numbers to the localized resource blocks and the distributed resource blocks according to a predetermined rule. For example, as shown in FIG. 6, the control information generating unit 106 first assigns numbers to the localized resource blocks in ascending order of the physical location numbers of the resource blocks, and then assigns numbers to the distributed resource blocks. This approach makes it possible to uniquely identify physical locations of the distributed resource blocks and the localized resource blocks based on their assigned numbers and the number of distributed resource blocks. This in turn makes it possible to report allocation information with a small number of bits.

Figure 7B:
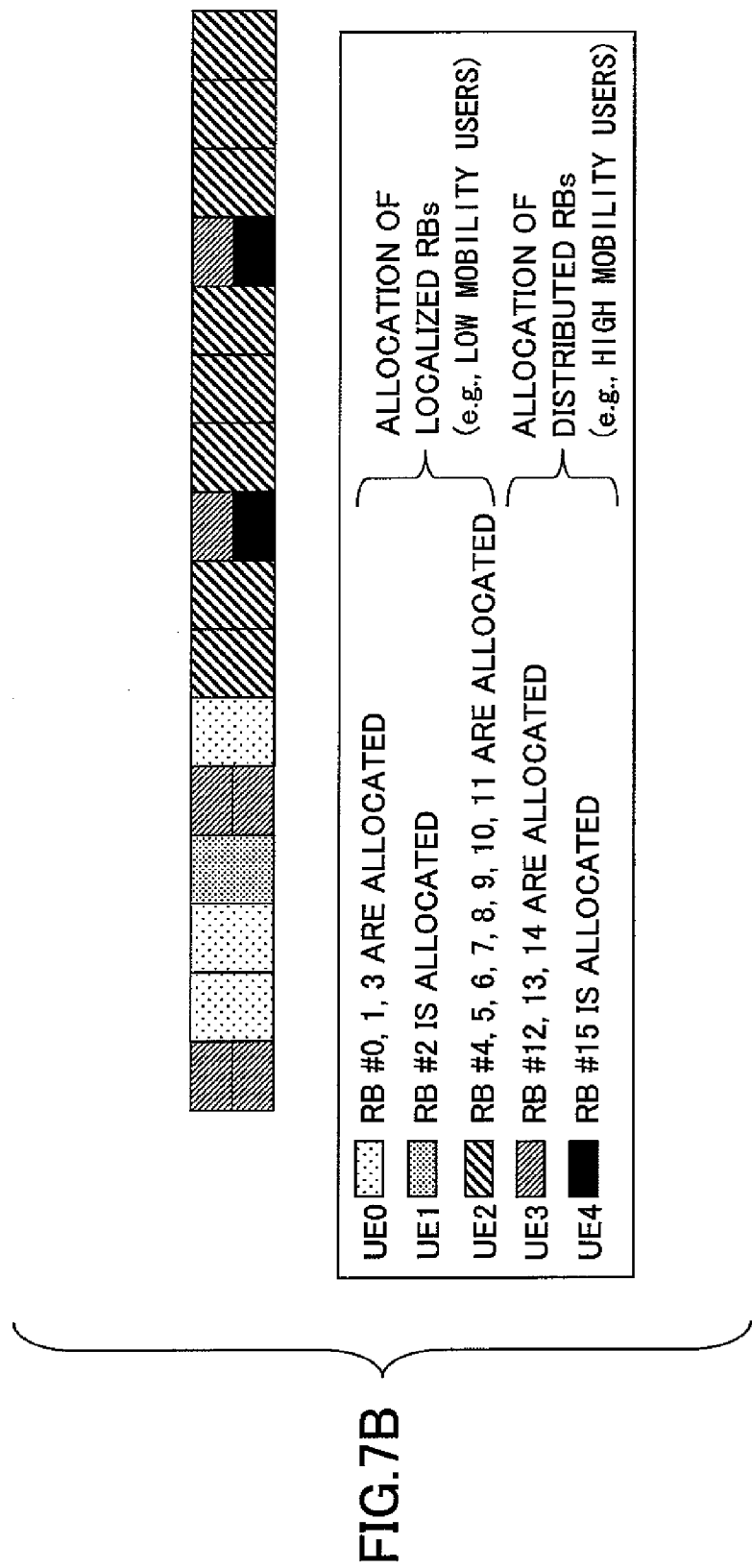
FIG. 7B is a drawing illustrating a method of reporting allocation information in localized and distributed multiplexing.

Exemplary resource block allocation to a mobile station 0 (UE0), a mobile station 1 (UE1), a mobile station 2 (UE2), a mobile station 3 (UE3), and a mobile station 4 (UE4) is described below with reference to FIGS. 7A and 7B.

Here, it is assumed that the mobile stations 0, 1, and 2 are low mobility users and the mobile stations 3 and 4 are high mobility users. In this case, the frequency scheduling unit 104 allocates localized resource blocks to the mobile stations 0, 1, and 2, and allocates distributed resource blocks to the mobile stations 3 and 4.

For example, the frequency scheduling unit 104 allocates resource blocks #0, #1, and #3 to the mobile station 0, resource block #2 to the mobile station 1, resource blocks #4, #5, #6, #7, #8, #9, #10, and #11 to the mobile station 2, resource blocks #12, #13, and #14 to the mobile station 3, and resource block #15 to the mobile station 4.

An exemplary method of reporting allocation information is described below.

As shown in FIG. 8, when encoding and sending allocation information for multiple mobiles stations collectively, the control information generating unit 106 reports the number of distributed resource blocks, IDs of mobile stations to which resource blocks are allocated, and mobile station numbers associated with resource block numbers of allocated resource blocks. In other words, the control information generating unit 106 generates control information including the number of identification codes identifying resource blocks, information indicating all mobile stations to which either frequency blocks or sub-blocks are allocated, and information indicating the correspondence between the mobile stations and the identification codes.

For example, when the number of distributed resource blocks is between 1 and 16, four bits are necessary to express the value.

Fields for the IDs of mobile stations are provided for the maximum number of allocatable users to which resource blocks can be allocated at the same time.

For example, when the maximum number of allocatable users is 4 and each mobile station ID is represented by 12 bits, "abcdefghijkl" (ID of a mobile station to which a user number #0 is assigned) is stored in #0 and similarly, IDs of other mobile stations are stored in #1 through #3. In this case, the total number of bits for mobile station IDs is 4×12=48.

The mobile station numbers used to indicate the correspondence between mobile stations and allocated resource blocks are represented by the user numbers #0 through #3 instead of mobile station IDs.

The resource block numbers are serial numbers assigned to the distributed resource blocks and the localized resource blocks and do not indicate physical locations of resource blocks. When the number of resource blocks is 16 and the maximum number of allocatable users is 4 (2 bits), the required number of bits is 16×2=32. For example, the mobile station #1 is specified for the resource block number #0, the mobile station #3 for the resource block number #1, the mobile station #0 for the resource block number #2, the mobile station #2 for the resource block number #3, and the mobile station #2 for the resource block number #4.

As an alternative method, allocation information may be encoded and sent for each mobile station.

In this case, as shown in FIG. 9, the control information generating unit 106 reports the number of distributed resource blocks, an ID of a mobile station to which resource blocks are allocated, and resource block numbers of allocated resource blocks. In other words, the control information generating unit 106 generates control information including the number of identification codes identifying resource blocks, information indicating a mobile station to which either frequency blocks or sub-blocks are allocated, and information indicating the correspondence between the mobile station and the identification codes.

For example, when the number of distributed resource blocks is between 1 and 16, four bits are necessary to express the value.

In the mobile station ID field, the ID of the mobile station is stored. The required number of bits for the mobile station ID is, for example, 12 bits.

The resource block numbers are serial numbers assigned to the distributed resource blocks and the localized resource blocks and do not indicate physical locations of resource blocks. For example, allocated resource blocks are flagged with "1" and unallocated resource blocks are flagged with "0". In this case, the required number of bits is, for example, 16 and is the same as the number of resource blocks. For example, 0 is specified for the resource block number #0, 0 for the resource block number #1, 0 for the resource block number #2, 1 for the resource block number #3, and 1 for the resource block number #4.

The coding-rate-and-data-modulation determining unit 108 determines a coding rate and a data modulation level used to transmit control information.

The mapping unit 110 modulates and encodes control information using the data modulation level and the coding rate determined by the coding-rate-and-data-modulation determining unit 108 and maps the control information to physical channels. As a result, the control information is transmitted.

The transmission data generating unit 112 generates transmission data according to the numbers of resource blocks allocated to the respective mobile stations. For example, the transmission data generating unit 112 determines the amount of transmission data.

The coding-rate-and-data-modulation determining unit 114 determines coding rates and data modulation levels used to transmit the data for the respective mobile stations to which resource blocks are allocated by the frequency scheduling unit 104.

The mapping unit 116 modulates and encodes the data and maps the data to physical channels.

Next, an exemplary process in the frequency scheduling unit 104 of allocating resource blocks to transmission data is described with reference to FIG. 10.

The frequency scheduling unit 104 allocates resource blocks preferentially to data to be sent by localized transmission.

Figure 10:
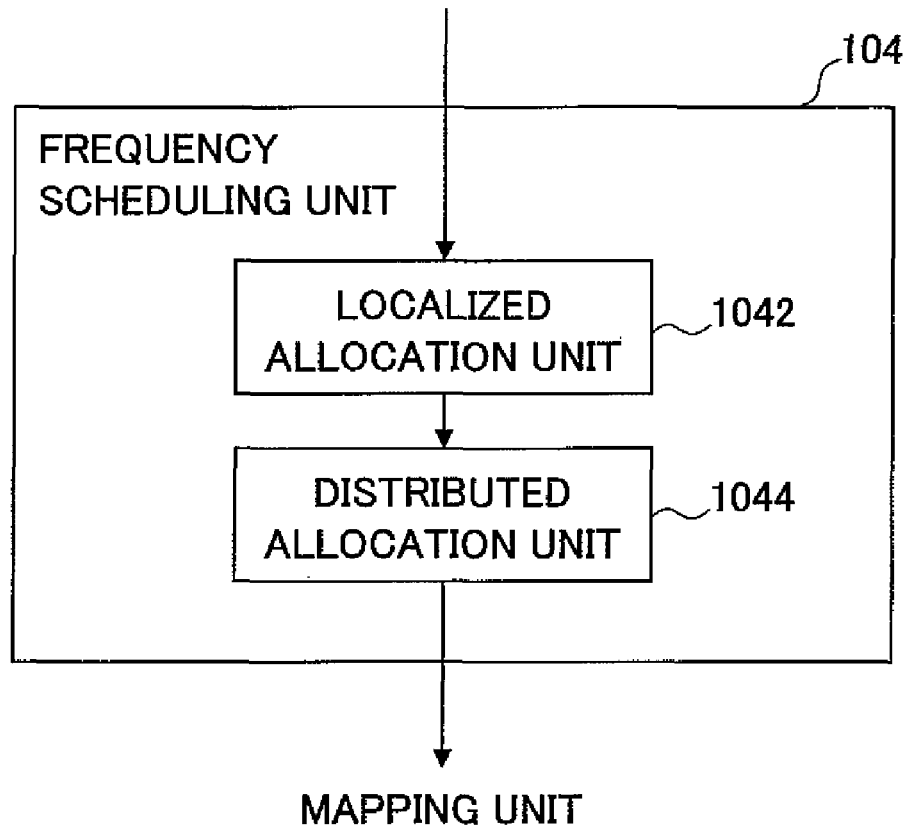
FIG. 10 is a partial block diagram illustrating a frequency scheduling unit of a transmission device according to an embodiment of the present invention.

As shown in FIG. 10, the frequency scheduling unit 104 includes a localized allocation unit 1042 and a distributed allocation unit 1044 that receives an output signal from the localized allocation unit 1042.

The localized allocation unit 1042 receives propagation path information of the respective mobile stations, priority information, and resource block allocation ratio information indicating the allocation ratio of localized resource blocks to distributed resource blocks, and allocates resource blocks preferentially to data to be sent by localized transmission based on the propagation path information and the priority information.

Figure 11:
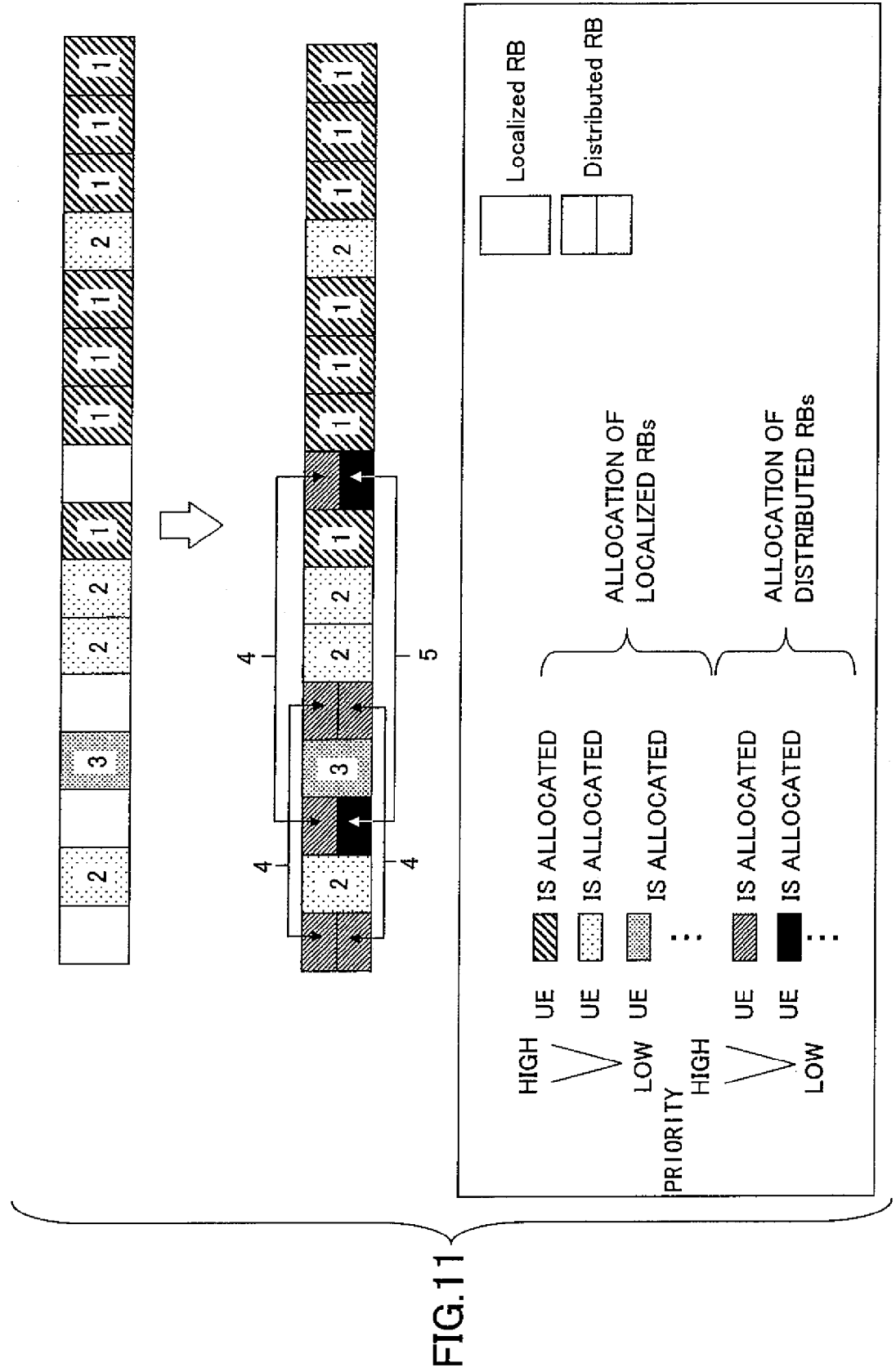
FIG. 11 is a drawing used to describe operations of a frequency scheduling unit of a transmission device according to an embodiment of the present invention.

As shown in FIG. 11, the localized allocation unit 1042 first allocates resource blocks to mobile stations to which localized transmission is applied taking into account the reception conditions of the mobile stations in the respective resource blocks. In this step, the localized allocation unit 1042 leaves resource blocks to be allocated to mobile stations to which distributed transmission is applied based on the resource block allocation ratio information. For example, the localized allocation unit 1042 allocates resource blocks to the mobile stations based on the priority information.

The distributed allocation unit 1044 allocates resource blocks, other than those allocated to data to be sent by localized transmission, to data to be sent by distributed transmission.

As shown in FIG. 11, after resource blocks are allocated to mobile stations to which localized transmission is applied, the distributed allocation unit 1044 allocates remaining resource blocks to mobile stations to which distributed transmission is applied. For example, the distributed allocation unit 1044 allocates resource blocks to the mobile stations based on the priority information.

Alternatively, the frequency scheduling unit 104 may be configured to allocate resource blocks preferentially to data to be sent by distributed transmission.

Figure 12:
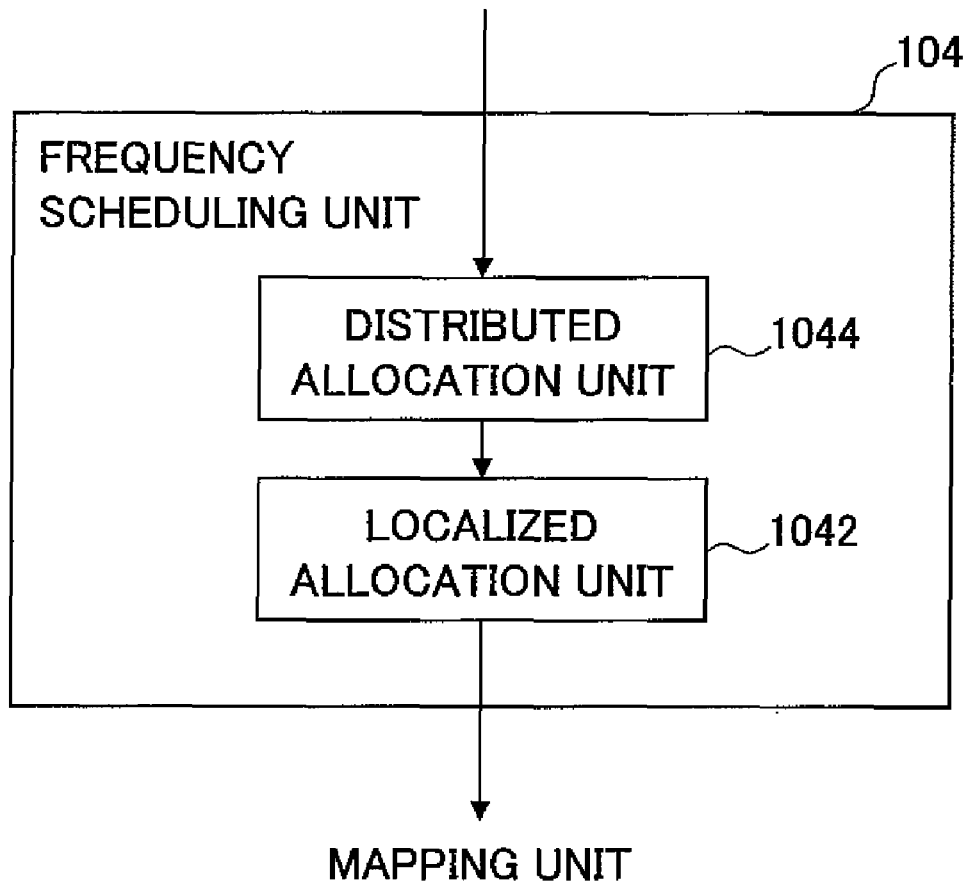
FIG. 12 is a partial block diagram illustrating a frequency scheduling unit of a transmission device according to an embodiment of the present invention.

In the example shown in FIG. 12, the frequency scheduling unit 104 includes a distributed allocation unit 1044 and a localized allocation unit 1042 that receives an output signal from the distributed allocation unit 1044.

The distributed allocation unit 1044 receives propagation path information of the respective mobile stations, priority information, and resource block allocation ratio information indicating the allocation ratio of localized resource blocks to distributed resource blocks, and allocates resource blocks preferentially to data to be sent by distributed transmission based on the propagation path information and the priority information.

Figure 13:
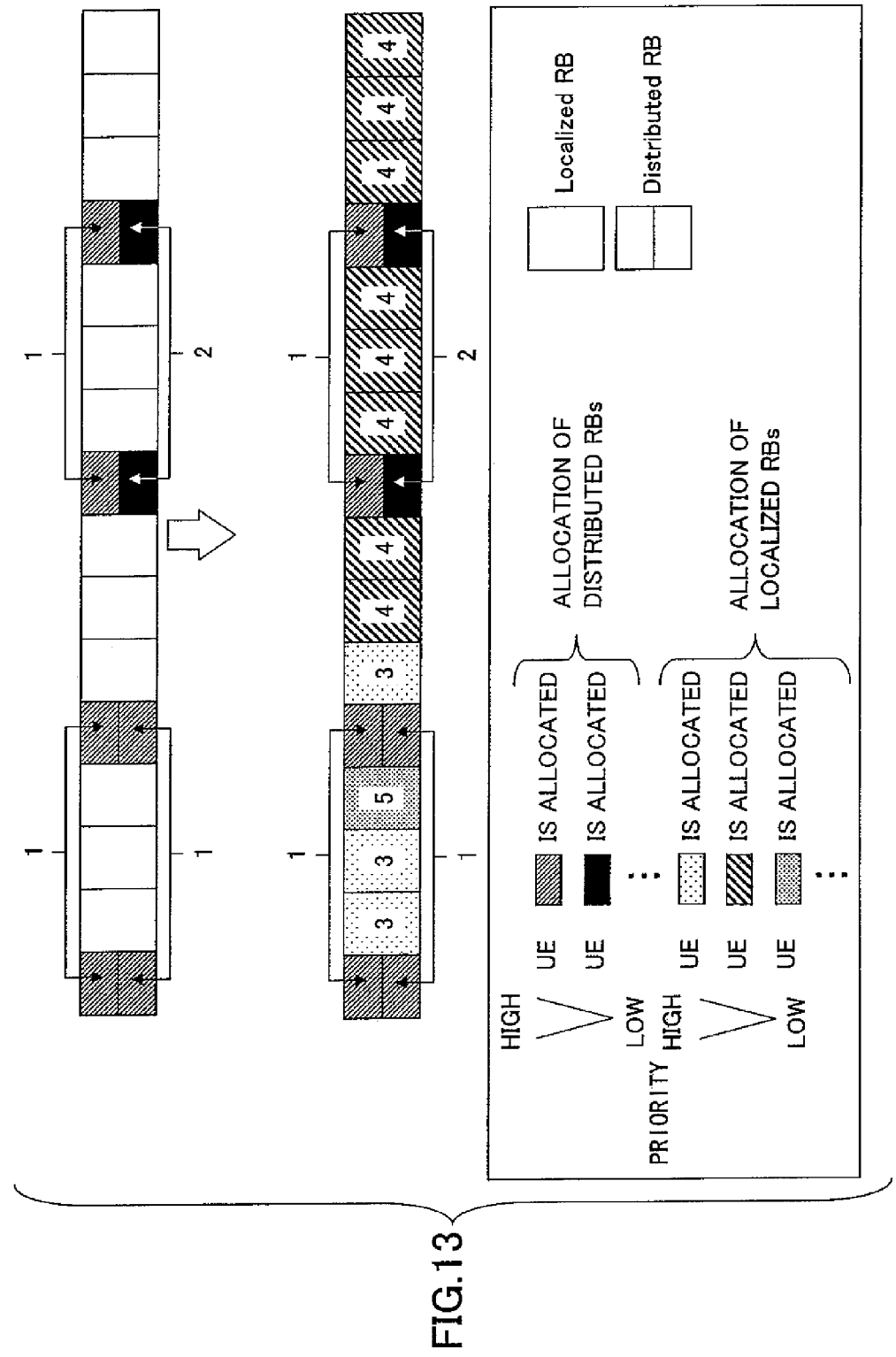
FIG. 13 is a drawing used to describe operations of a frequency scheduling unit of a transmission device according to an embodiment of the present invention.

As shown in FIG. 13, the distributed allocation unit 1044 preferentially allocates resource blocks to mobile stations to which distributed transmission is applied taking into account the reception conditions of the mobile stations in the respective resource blocks or in such a manner that the frequency diversity gain is increased. In this step, the distributed allocation unit 1044 leaves resource blocks to be allocated to mobile stations to which localized transmission is applied based on the resource block allocation ratio information. For example, the distributed allocation unit 1044 allocates resource blocks to the mobile stations based on the priority information.

As shown in FIG. 13, after resource blocks are allocated to mobile stations to which distributed transmission is applied, the localized allocation unit 1042 allocates remaining resource blocks to mobile stations to which localized transmission is applied. For example, the localized allocation unit 1042 allocates resource blocks to the mobile stations based on the priority information.

As another example, the frequency scheduling unit 104 may be configured to allocate resource blocks reserved for localized transmission and distributed transmission, respectively.

In this case, the frequency scheduling unit 104 allocates reserved resource blocks to users to which localized transmission is applied and to users to which distributed transmission is applied, respectively. With this approach, because resource blocks are reserved for localized transmission and distributed transmission, respectively, the order of allocation is not relevant to the allocation results.

Figure 14:
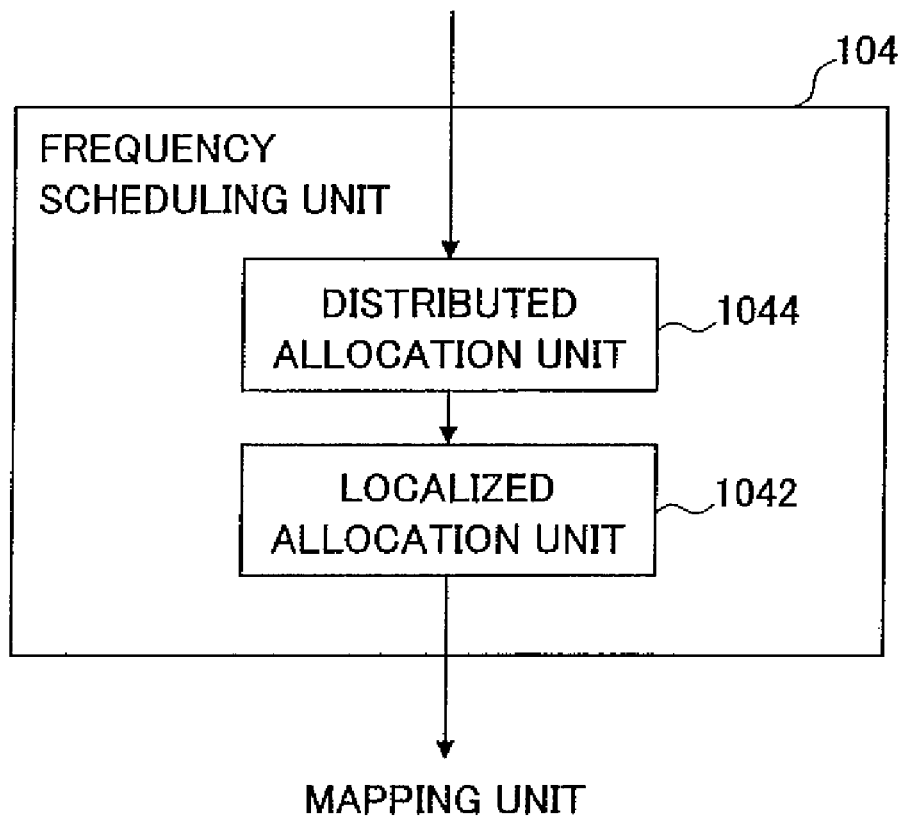
FIG. 14 is a partial block diagram illustrating a frequency scheduling unit of a transmission device according to an embodiment of the present invention.

In the example shown in FIG. 14, the frequency scheduling unit 104 includes a distributed allocation unit 1044 and a localized allocation unit 1042 that receives an output signal from the distributed allocation unit 1044.

The distributed allocation unit 1044 receives propagation path information of the respective mobile stations, priority information, and resource block allocation ratio information indicating the allocation ratio of localized resource blocks to distributed resource blocks.

Figure 15:
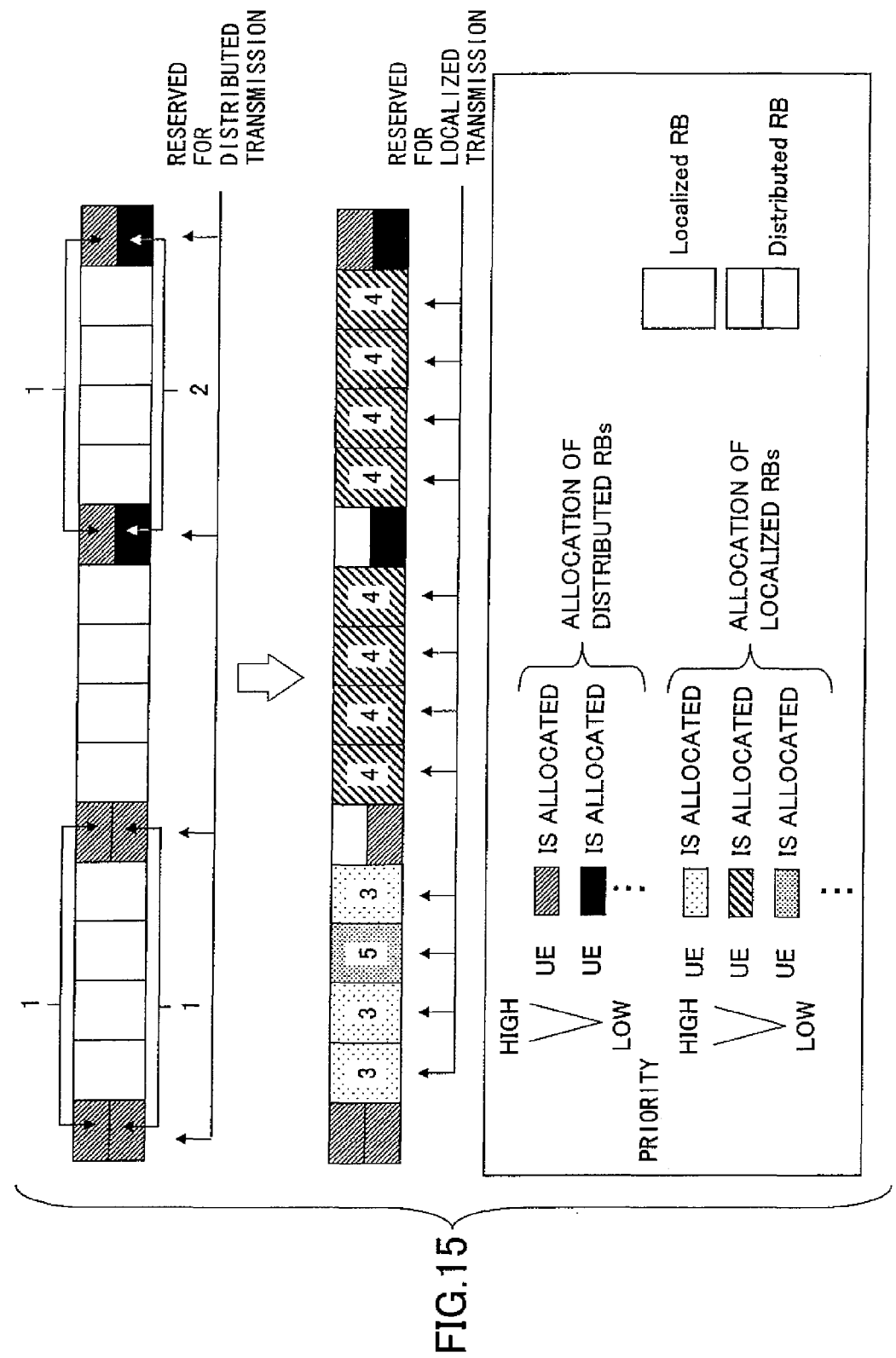
FIG. 15 is a drawing used to describe operations of a frequency scheduling unit of a transmission device according to an embodiment of the present invention.

As shown in FIG. 15, the distributed allocation unit 1044 allocates resource blocks reserved for distributed transmission to mobile stations to which distributed transmission is applied. For example, the distributed allocation unit 1044 allocates the reserved resource blocks to the mobile stations based on the priority information.

As shown in FIG. 15, the localized allocation unit 1042 allocates resource blocks reserved for localized transmission to mobile stations to which localized transmission is applied.

For example, the localized allocation unit 1042 allocates the reserved resource blocks to the mobile stations based on the priority information.

Figure 16:
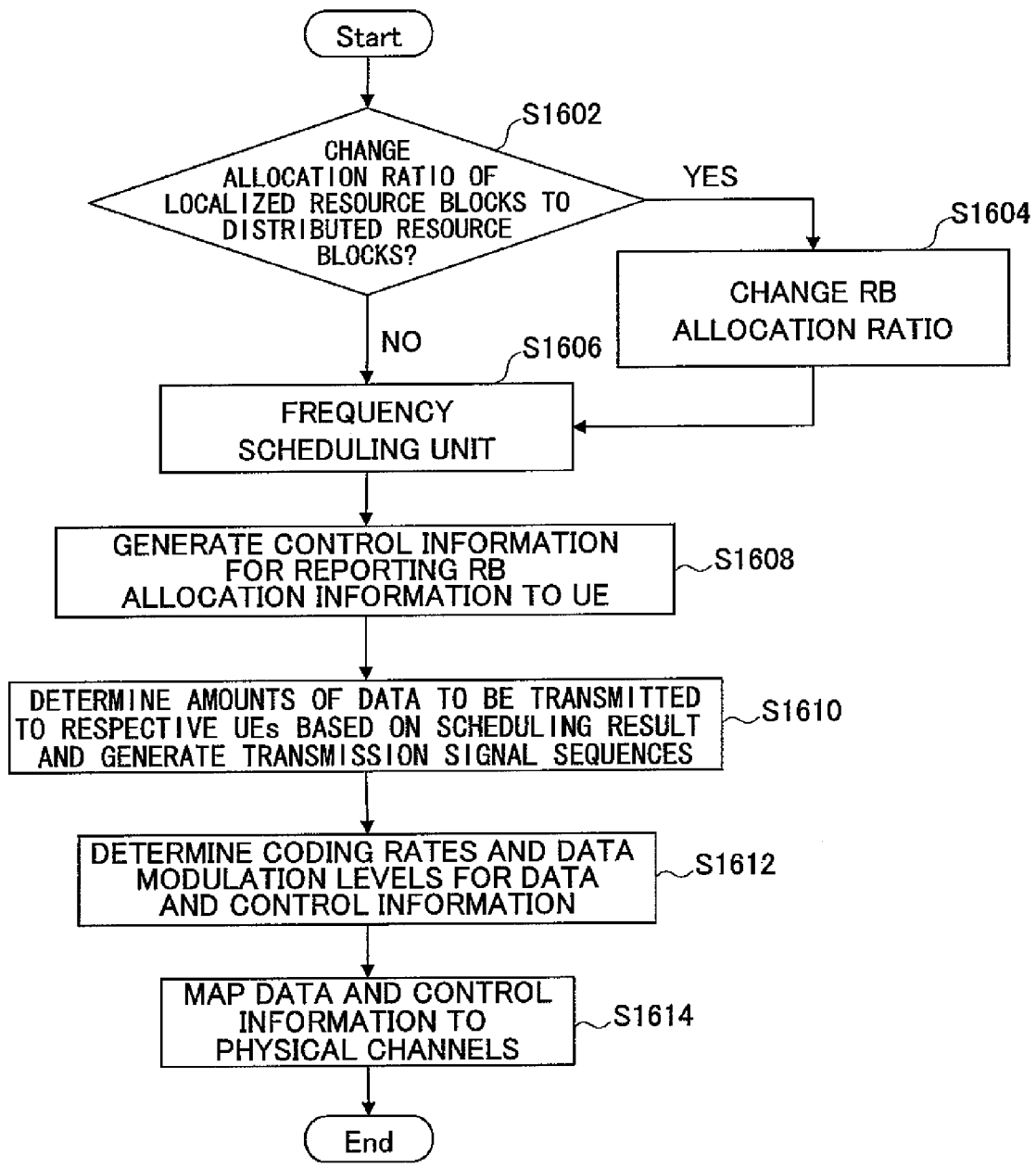
FIG. 16 is a flowchart showing a process of allocating radio resources in a transmission device according to an embodiment of the present invention.

Next, an exemplary process of allocating radio resources by the transmission device 100 is described with reference to FIG. 16.

The frequency scheduling unit 104 determines whether it is time to change the allocation ratio of localized resource blocks to distributed resource blocks (step S1602).

If it is time to change the allocation ratio of localized resource blocks to distributed resource blocks (YES in step S1602), the resource block allocation ratio changing unit 102 changes the resource block allocation ratio (step S1604).

After the resource block allocation ratio is changed in step S1604 or if it is not time to change the resource block allocation ratio (NO in step S1602), the process goes to step S1606. In step S1606, the frequency scheduling unit 104 allocates resource blocks as described above to mobile stations to which localized or distributed transmission is applied (step S1606).

Then, the control information generating unit 106 generates control information for reporting resource block allocation information to the mobile stations (step S1608).

Next, the transmission data generating unit 112 determines the amounts of data to be transmitted to the respective mobile stations based on the scheduling result of the frequency scheduling unit 104, and generates transmission signal sequences (step S1610).

The coding-rate-and-data-modulation determining units 108 and 114 determine coding rates and data modulation levels, respectively, for the data and the control information (step S1612).

Then, the mapping units 110 and 116 map the control information and the data, respectively, to physical channels (step S1614).

A transmission device according to another embodiment of the present invention is described below.

Figure 2:
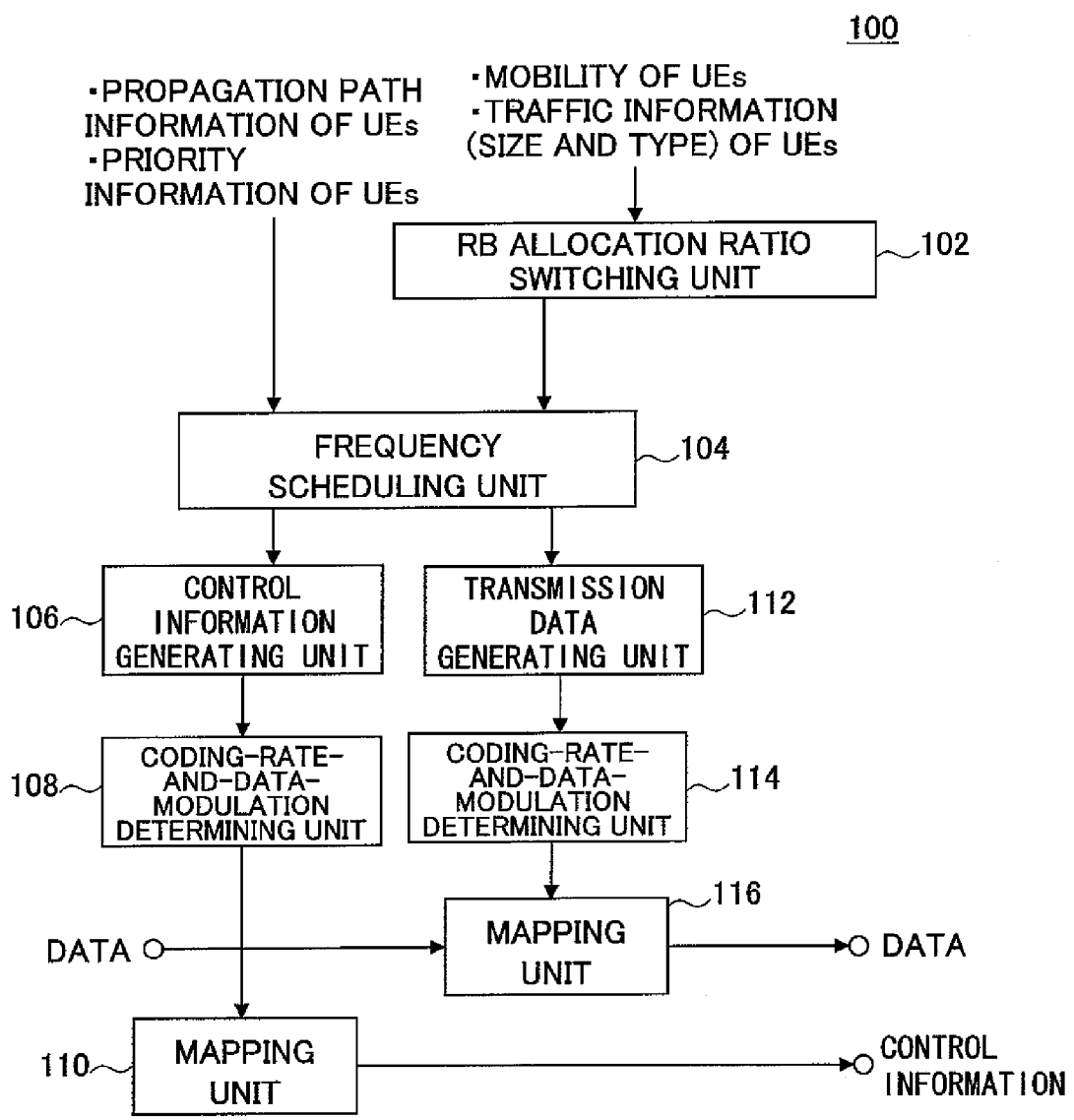
FIG. 2 is a partial block diagram illustrating a transmission device according to an embodiment of the present invention.

The configuration of a transmission device 100 of this embodiment is substantially the same as that shown in FIG. 2, and therefore descriptions of the configuration are omitted here. The transmission device 100 of this embodiment is different from the transmission device of the above embodiment in the operations of the control information generating unit 106.

The control information generating unit 106 generates control information for the mobile stations to which resource blocks are allocated by the frequency scheduling unit 104.

The control information generating unit 106 assigns identification codes, for example, numbers, indicating physical locations of resource blocks to the numbers of localized resource blocks. For example, when there are 16 resource blocks in a frequency band and all the resource blocks are used as localized resource blocks as shown in FIG. 5, the numbers assigned to the localized resource blocks and the numbers indicating physical locations of the resource blocks become identical.

When distributed transmission is performed, the control information generating unit 106 converts a subset of the resource blocks into distributed resource blocks. For example, the control information generating unit 106 converts four resource blocks into distributed resource blocks.

In this embodiment, localized resource blocks that are to be converted into distributed resource blocks are selected according to a predetermined rule depending on the number of distributed resource blocks.

For example, the control information generating unit 106 allocates frequency blocks and distributed frequency blocks as described below. In this example, one distributed resource block (distributed frequency block) is divided into $N_D$ resource blocks. Sets of the $N_D$ resource blocks are positioned apart from each other by a distance C expressed by formula (1) below.

[Formula 1]

$$C = \lfloor N_{PRB}/N_D \rfloor \quad (1)$$

In formula (1), $N_{PRB}$ represents the number of physical locations of resource blocks. Digits after the decimal point of $N_{PRB}/N_D$ are truncated.

When the number of distributed resource blocks is $N_{DVRB}$ and $N_{DVRB} = N_{D\text{-}PRB} \times N_D$ ($N_{D\text{-}PRB}$ is an integer that satisfies $0 \leq N_{D\text{-}PRB} \leq C$), $N_{D\text{-}PRB}$ "paired physical resource blocks" are allocated for distributed transmission. Location k of each physical resource block is expressed by formula (2) below.

[Formula 2]

$$k = i \times C + j \times \lfloor C/N_{D\text{-}PRB} \rfloor \quad (2)$$

In formula (2), i represents values 0 through $N_D-1$, and j represents values 0 through $N_{D\text{-}PRB}-1$.

Figure 17A:
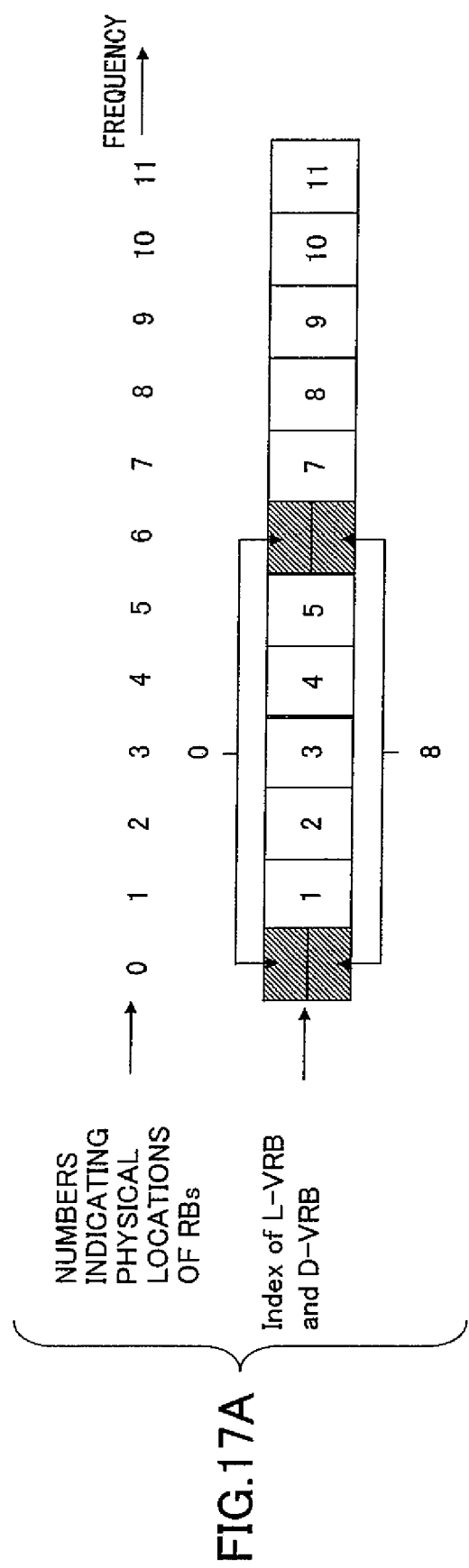
FIG. 17A is a drawing illustrating a method of reporting allocation information in localized and distributed multiplexing.
Figure 17B:
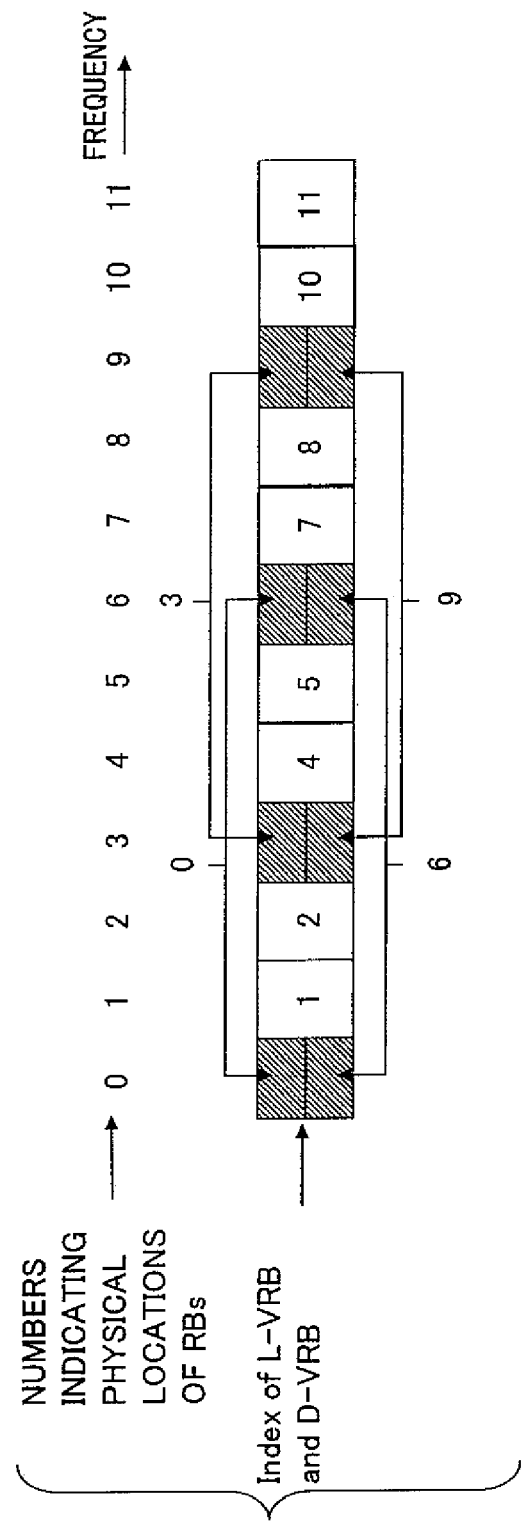
FIG. 17B is a drawing illustrating a method of reporting allocation information in localized and distributed multiplexing.

FIG. 17A shows an example where $N_{PRB}$ is 12, $N_D$ is 2, and $N_{DVRB}$ is 2. FIG. 17B shows an example where $N_{PRB}$ is 12, $N_D$ is 2, and $N_{DVRB}$ is 4. In FIGS. 17A and 17B, numbers written in localized RBs and beside distributed RBs represent the numbers assigned to localized resource blocks and distributed resource blocks, respectively, and numbers written above the RBs represent physical locations of the resource blocks.

This approach enables the transmission device 100 to report allocation information by just sending the number of distributed resource blocks to receiving devices. For example, a mobile station to which localized transmission is to be applied can identify resource blocks allocated to itself based only on the locations of the resource blocks. Meanwhile, a mobile station to which distributed transmission is to be applied can identify resource blocks allocated to itself based on the number of distributed resource blocks and information indicating the locations of the resource blocks.

Also, this approach makes it possible to uniquely determine resource blocks to be used as distributed resource blocks based on the number of the distributed resource blocks. In other words, this approach makes it possible to uniquely identify physical locations of distributed resource blocks and localized resource blocks based on their assigned numbers and the number of the distributed resource blocks. This in turn makes it possible to report allocation information with a small number of bits.

Figure 18A:
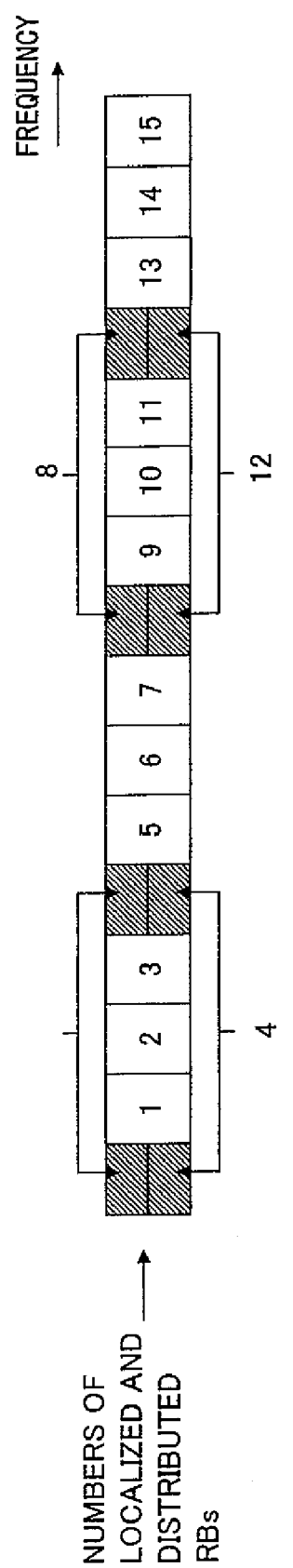
FIG. 18A is a drawing illustrating a method of reporting allocation information in localized and distributed multiplexing.
Figure 18B:
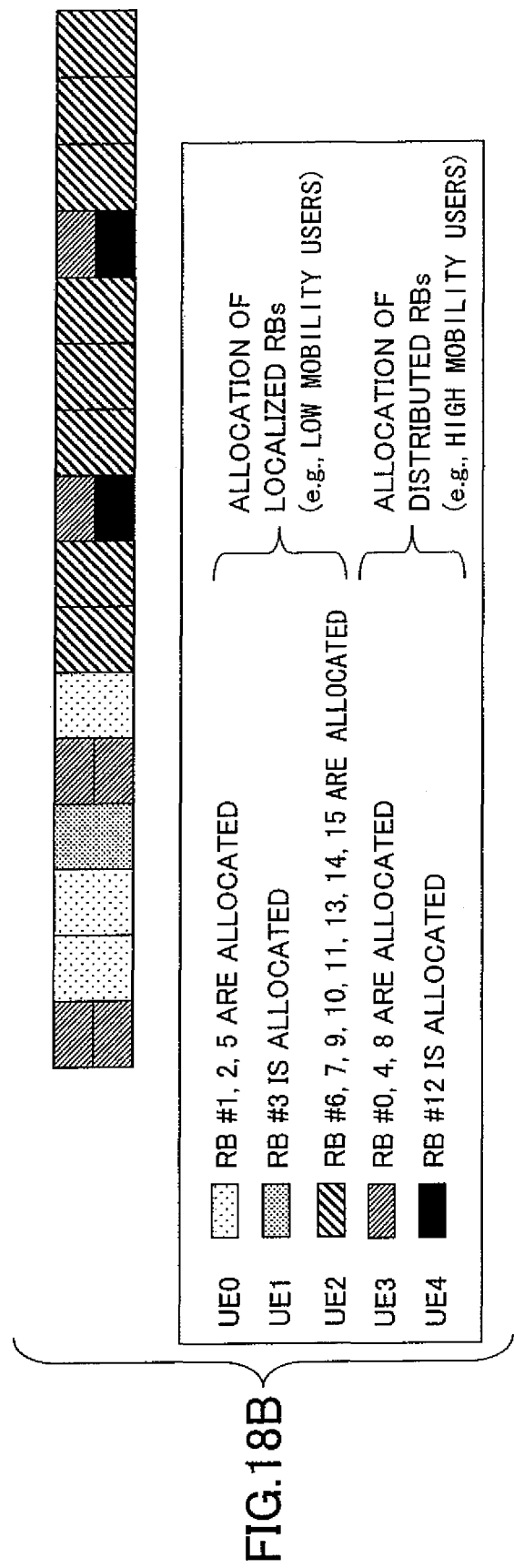
FIG. 18B is a drawing illustrating a method of reporting allocation information in localized and distributed multiplexing.

Exemplary resource block allocation for a mobile station 0 (UE0), a mobile station 1 (UE1), a mobile station 2 (UE2), a mobile station 3 (UE3), and a mobile station 4 (UE4) is described below with reference to FIGS. 18A and 18B. In FIGS. 18A and 18B, numbers written in localized RBs and beside distributed RBs represent the numbers assigned to localized resource blocks and distributed resource blocks, respectively.

Here, it is assumed that the mobile stations 0, 1, and 2 are low mobility users and the mobile stations 3 and 4 are high mobility users. In this case, the frequency scheduling unit 104 allocates localized resource blocks to the mobile stations 0, 1, and 2, and allocates distributed resource blocks to the mobile stations 3 and 4.

For example, as shown in FIG. 18B, the frequency scheduling unit 104 allocates resource blocks #1, #2, and #5 to the mobile station 0, resource block #3 to the mobile station 1, resource blocks #6, #7, #9, #10, #11, #13, #14, and #15 to the mobile station 2, resource blocks #0, #4, and #8 to the mobile station 3, and resource block #12 to the mobile station 4.

An exemplary method of reporting allocation information is described below.

Figure 19:
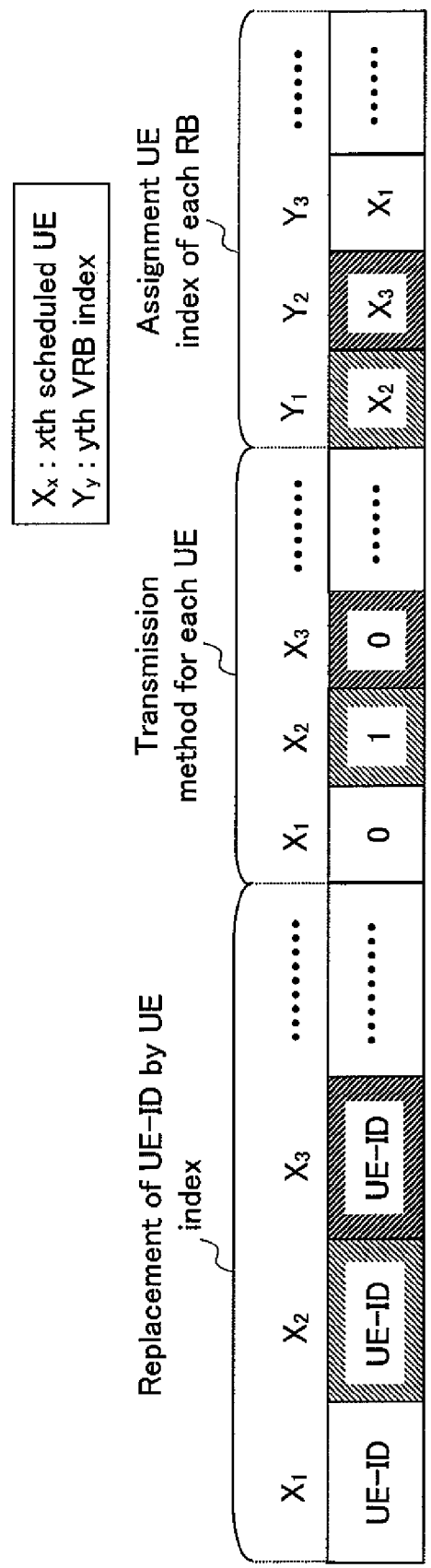
FIG. 19 is a drawing illustrating a method of reporting allocation information in localized and distributed multiplexing.

As shown in FIG. 19, when encoding and sending allocation information for multiple mobile stations collectively, the control information generating unit 106 reports UE-IDs associated with UE indexes (Replacement of UE-ID by UE index), transmission methods for the respective UEs (Transmission method for each UE), and the UE indexes associated with resource blocks (Assignment UE index of each RB).

The UE-IDs are identification information of all mobile stations and associated with UE indexes. UE-ID fields are provided for the maximum number of users to which resource blocks can be allocated at the same time. The UE-ID fields store the IDs of UEs to which resource blocks are allocated. For example, when the maximum number of allocatable users is 4 and each UE-ID is represented by 12 bits, #0:abcdefghijkl (UE-ID of a mobile station to which a user number #0 is assigned) is stored in #0 and similarly, UE-IDs of other mobile stations are stored in #1 through #3. In this case, the total number of bits for UE-IDs is 4×12=48.

The user numbers #0 through #3 are used instead of UE-IDs to indicate the correspondence between UEs and allocated resource blocks.

In transmission method fields, information indicating distributed transmission or localized transmission is stored for the respective users to which resource blocks are allocated by the frequency scheduling unit 104. The transmission method fields are provided for the maximum number of users to which resource blocks can be allocated at the same time. For example, "1" indicates distributed transmission and "0" indicates localized transmission. In other words, in the transmission method fields, information indicating whether frequency blocks or sub-blocks are allocated is stored in association with the identification information identifying all the mobile stations.

In UE index fields, user numbers indicating mobile stations are stored in association with the resource block numbers (that are different from those indicating physical locations of resource blocks) assigned to distributed resource blocks and localized resource blocks. In other words, the UE index fields store identification information of mobile stations in association with identification codes indicating locations of frequency blocks and sub-blocks.

For example, when the number of resource blocks is 16 and the maximum number of allocatable users is 4 (2 bits), the required number of bits is 16×2=32.

As an alternative method, allocation information may be encoded and sent for each mobile station.

Figure 20:
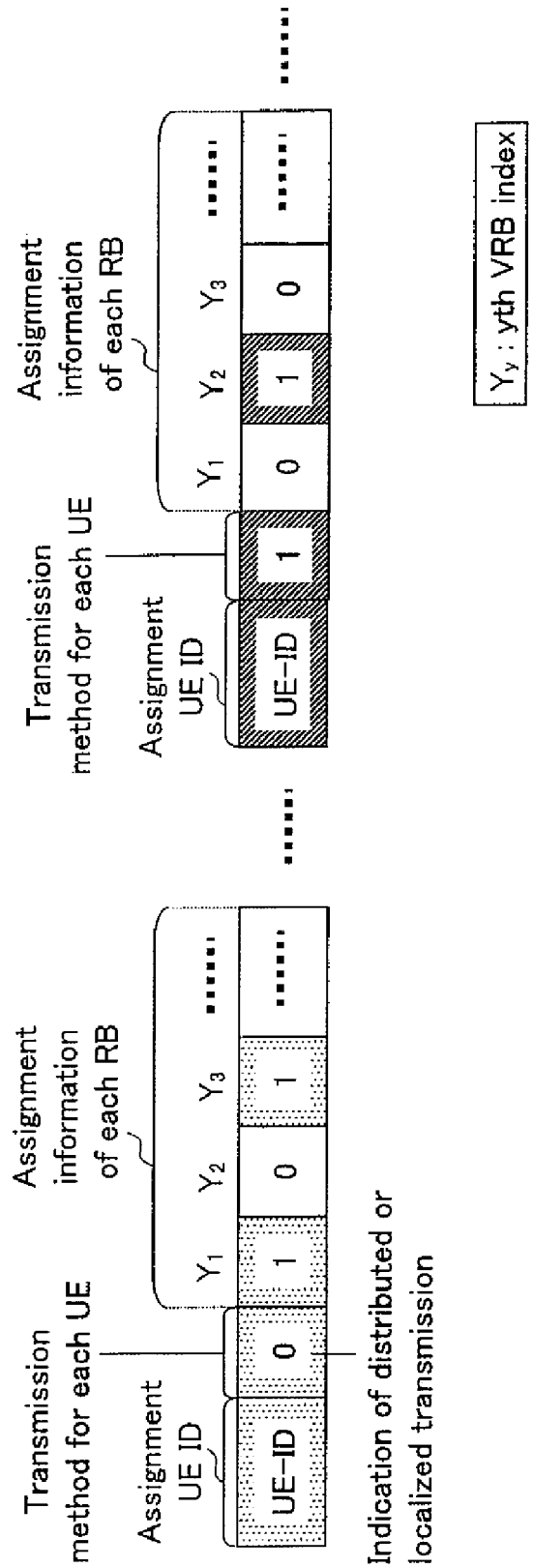
FIG. 20 is a drawing illustrating a method of reporting allocation information in localized and distributed multiplexing.

In this case, as shown in FIG. 20, the control information generating unit 106 reports a UE-ID associated with a UE index (Assignment UE-ID), a transmission method for the UE (Transmission method for each UE), and resource block allocation information (Assignment information of each RB).

The UE-ID is identification information of a mobile station and associated with a UE index. The UE-ID field stores the ID of a UE to which resource blocks are allocated. For example, the UE-ID may be represented by 12 bits.

In the transmission method field, information indicating distributed transmission or localized transmission is stored for the user to which resource blocks are allocated by the frequency scheduling unit 104. For example, "1" indicates distributed transmission and "0" indicates localized transmission. In other words, in the transmission method field, information indicating whether frequency blocks or sub-blocks are allocated is stored in association with the identification information of the mobile station.

In the resource block allocation information fields, information indicating whether resource blocks are allocated for the user is stored in association with the corresponding resource block numbers (that are different from those indicating physical locations of resource blocks) assigned to the distributed resource blocks and the localized resource blocks. For example, "1" indicates that the resource block is allocated for the user and "0" indicates that the resource block is not allocated for the user. In other words, the identification information of the mobile station is associated with identification codes indicating locations of frequency blocks and sub-blocks.

Next, a transmission device according to another embodiment of the present invention is described.

The configuration of a transmission device 100 of this embodiment is substantially the same as that shown in FIG. 2, and therefore descriptions of the configuration are omitted here. The transmission device 100 of this embodiment is different from the transmission device of the above embodiments in the operations of the control information generating unit 106.

The control information generating unit 106 generates control information for the mobile stations to which resource blocks are allocated by the frequency scheduling unit 104.

In this embodiment, locations of distributed resource blocks and the dividing pattern are predetermined. More specifically, which resource blocks are to be converted into distributed resource blocks and which distributed resource blocks are to be divided into how many sub-blocks are determined by a preset rule depending on the number of the distributed resource blocks.

FIGS. 21A and 21B show examples where the numbers of distributed resource blocks are two and three, respectively. In the examples shown in FIGS. 21A and 21B, the number of distributed resource blocks is made identical with the division number into which each distributed resource block is divided. In FIGS. 21A and 21B, numbers written in localized RBs and beside distributed RBs represent the numbers assigned to localized resource blocks and distributed resource blocks, respectively, and numbers written above the RBs represent physical locations of the resource blocks.

If the number of distributed resource blocks is made identical with the division number of each distributed resource block, the number of distributed resource blocks becomes equal to the number of allocatable distributed resource blocks. As a result, regardless of the number of distributed resource blocks, all of the distributed resource blocks can be allocated. Compared with the above embodiments, this approach makes it possible to improve radio resource allocation efficiency.

Alternatively, the number of distributed resource blocks may be made different from the division number of each distributed resource block.

Figure 22B:
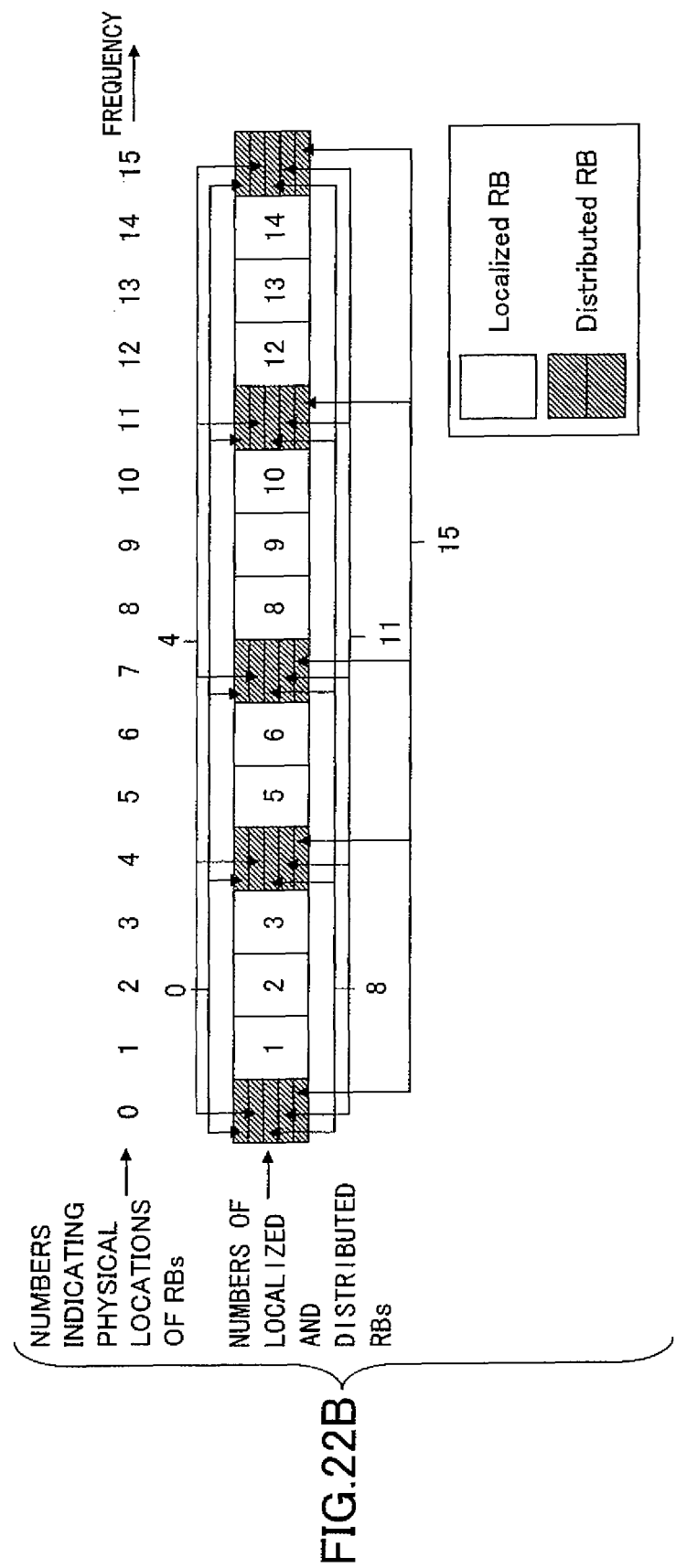
FIG. 22B is a drawing used to describe operations of a frequency scheduling unit of a transmission device according to an embodiment of the present invention.

FIG. 22A shows an example where the number of distributed resource blocks is 5 and the division number of each distributed resource block is 2 or 3. FIG. 22B shows an example where the number of distributed resource blocks is 5 and the division number of each distributed resource block is 5. In FIGS. 22A and 22B, numbers written in localized RBs and beside distributed RBs represent the numbers assigned to localized resource blocks and distributed resource blocks, respectively, and numbers written above the RBs represent physical locations of the resource blocks.

Dividing distributed resource blocks by multiple dividing patterns makes it possible to make the number of distributed resource blocks identical with the number of allocatable distributed resource blocks.

Next, an exemplary method of assigning identification codes or serial numbers to localized and distributed resource blocks is described with reference to FIGS. 21A through 22B.

Serial numbers are assigned separately to localized resource blocks and distributed resource blocks. To the localized resource blocks, serial numbers are assigned such that the numbers indicating the physical locations of the resource blocks become identical with the serial numbers. To the distributed resource blocks, serial numbers are assigned separately from those of the localized resource blocks according to the dividing pattern of the distributed resource blocks.

By assigning serial numbers separately to distributed resource blocks and localized resource blocks and by allocating resource blocks such that the serial numbers of the allocated resource blocks become consecutive, it is possible to reduce the number of control bits used to report allocation information. An example of this method is described later.

This method of assigning serial numbers to resource blocks may also be applied to a case as shown in FIG. 6 where serial numbers are first assigned to localized resource blocks and then assigned to distributed resource blocks. Also, this method may be applied to a case where serial numbers are first assigned to distributed resource blocks and then assigned to localized resource blocks.

Further, this method may be applied regardless of whether the division number of each distributed resource block is predetermined or not predetermined.

Next, an exemplary method of assigning identification codes or serial numbers to localized resource blocks and distributed resource blocks is described with reference to FIGS. 23A through 24B. In FIGS. 23A through 24B, numbers written in localized RBs and beside distributed RBs represent the numbers assigned to localized resource blocks and distributed resource blocks, respectively, and numbers written above the RBs represent physical locations of the resource blocks.

Figure 23A:
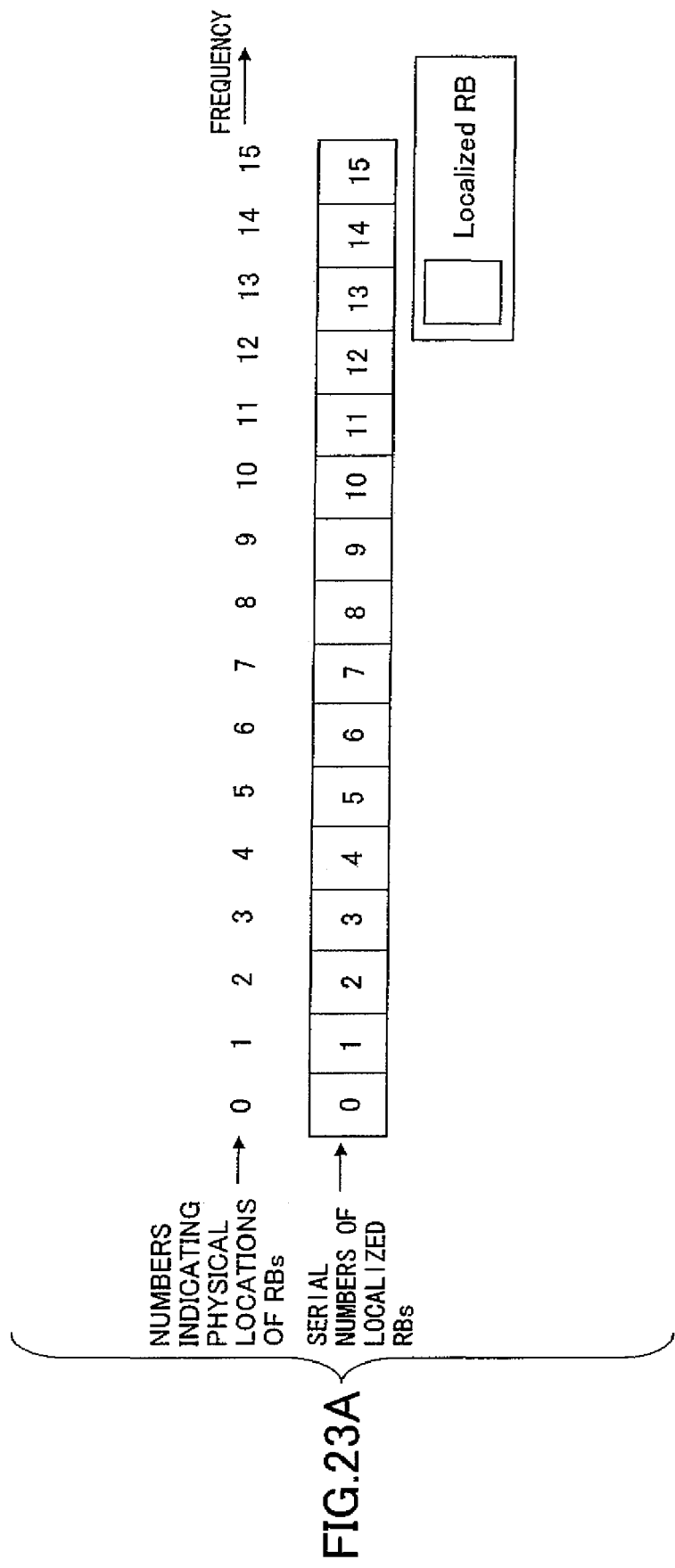
FIG. 23A is a drawing used to describe operations of a frequency scheduling unit of a transmission device according to an embodiment of the present invention.

In this method, serial numbers to be assigned to localized resource blocks are predetermined as shown in FIG. 23A. Similarly, serial numbers to be assigned to distributed resource blocks are predetermined as shown in FIG. 23B. FIG. 23B shows an example where the division number of each resource block is 2.

In this case, the physical locations of resource blocks to be used as distributed resource blocks are determined based on the number of the distributed resource blocks. For example, when the number of distributed resource blocks is 2, resource blocks with physical location numbers 0 and 8 are used as the distributed resource blocks, and identification codes 0 and 1 are assigned to the respective distributed resource blocks.

Figure 24A:
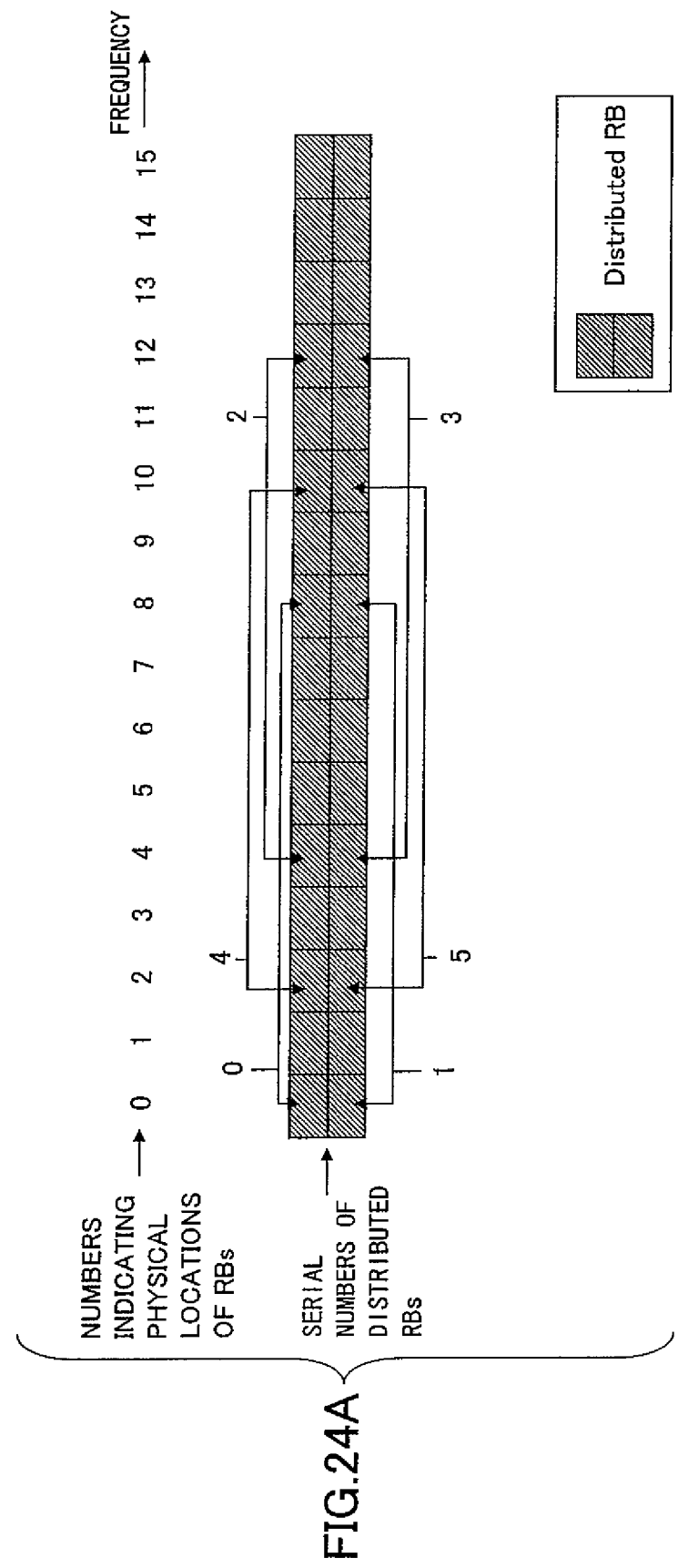
FIG. 24A is a drawing used to describe operations of a frequency scheduling unit of a transmission device according to an embodiment of the present invention.
Figure 24B:
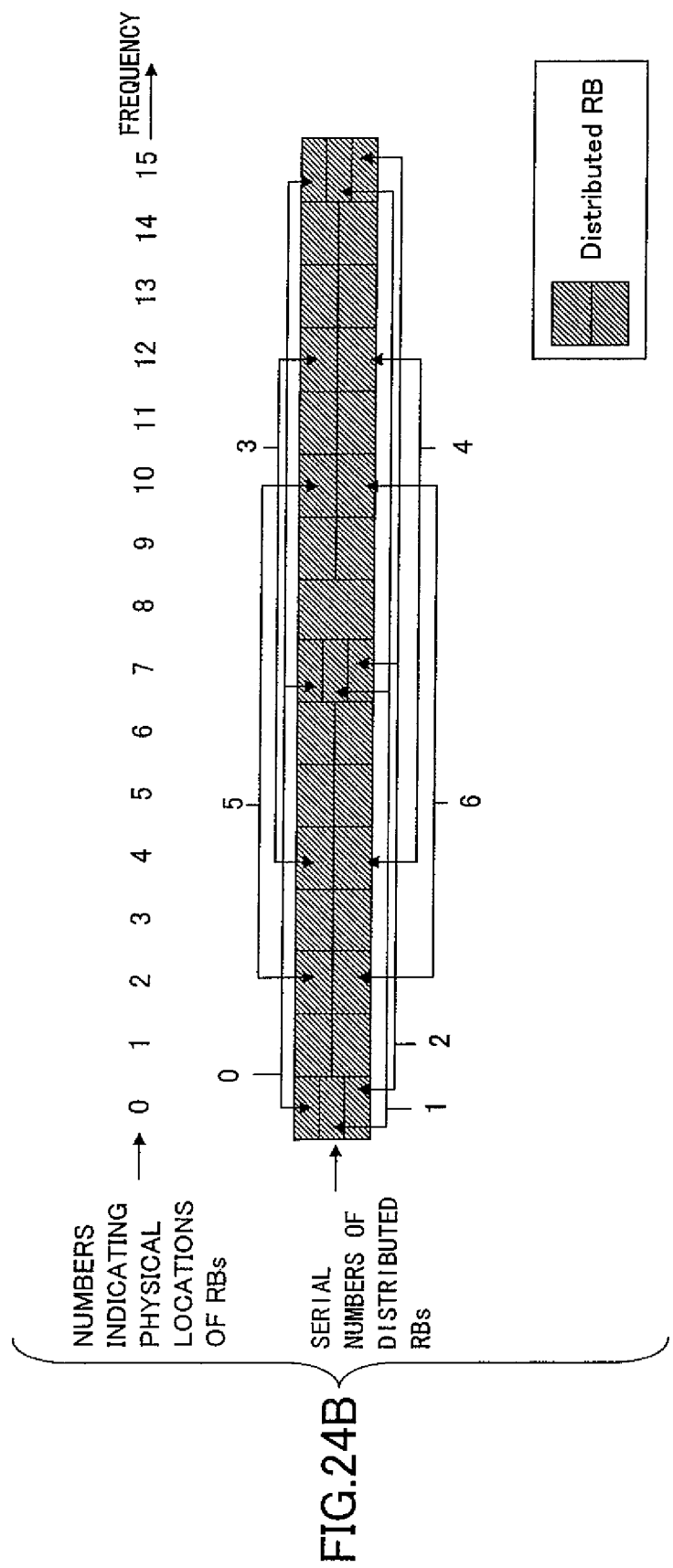
FIG. 24B is a drawing used to describe operations of a frequency scheduling unit of a transmission device according to an embodiment of the present invention.

Alternatively, as shown in FIGS. 24A and 24B, the dividing pattern of distributed resource blocks and assignment of serial numbers to the distributed resource blocks may be changed depending on whether the number of the distributed resource blocks is an even number or an odd number. FIG. 24A shows an example where the number of distributed resource blocks is an even number and the division number of each distributed resource block is 2. FIG. 24B shows an example where the number of distributed resource blocks is an odd number and the division number of each distributed resource block is 1, 2, or 3.

The dividing patterns of distributed resource blocks and assignment of serial numbers to the distributed resource blocks shown in FIGS. 24A and 24B are just examples and may be changed as necessary.

Thus, in the above method, the dividing pattern of distributed resource blocks and assignment of serial numbers to the distributed resource blocks are changed depending on whether the number of the distributed resource blocks is an even number or an odd number. This method makes it possible for a mobile station to determine the dividing pattern of the distributed resource blocks based only on whether the number of the distributed resource blocks is an even number or an odd number.

Figure 25A:
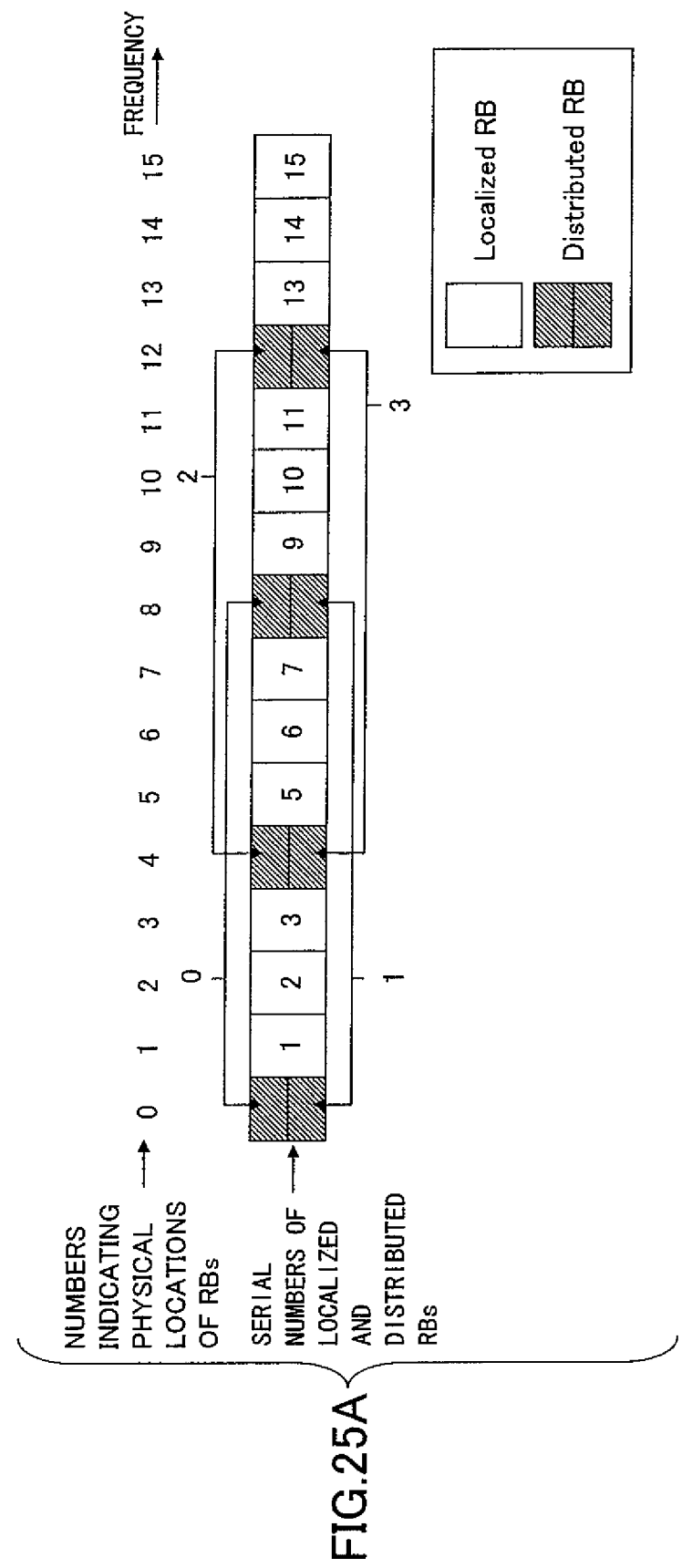
FIG. 25A is a drawing used to describe operations of a frequency scheduling unit of a transmission device according to an embodiment of the present invention.

For example, when the number of distributed resource blocks is 4 as shown in FIG. 25A, resource blocks with physical location numbers 0, 4, 8, and 12 are used as the distributed resource blocks and numbers 0 through 3 are assigned to the distributed resource blocks according to the serial number assignment scheme shown in FIG. 24A, and other resource blocks are used as localized resource blocks.

Figure 25B:
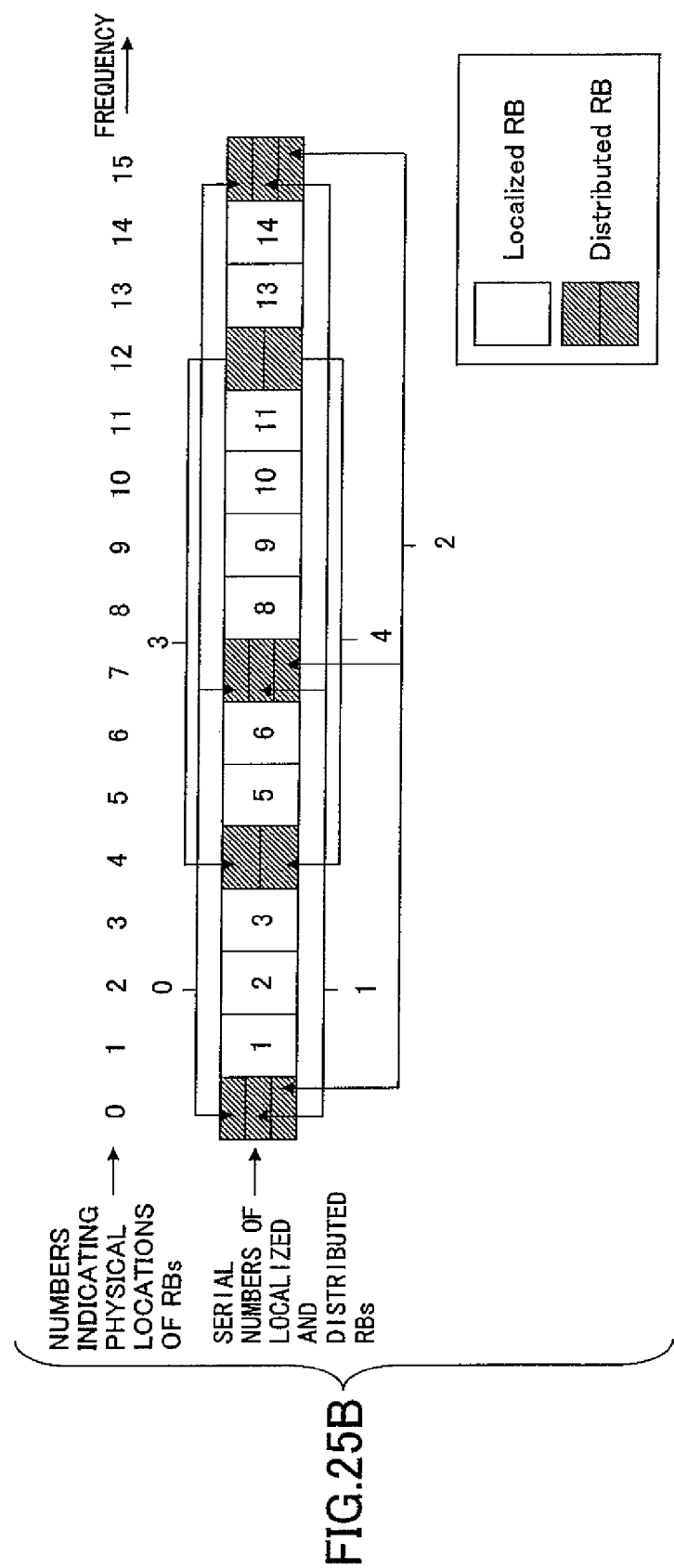
FIG. 25B is a drawing used to describe operations of a frequency scheduling unit of a transmission device according to an embodiment of the present invention.

As another example, when the number of distributed resource blocks is 5 as shown in FIG. 25B, resource blocks with physical location numbers 0, 4, 7, 12, and 15 are used as the distributed resource blocks and numbers 0 through 4 are assigned to the distributed resource blocks according to the serial number assignment scheme shown in FIG. 24B, and other resource blocks are used as localized resource blocks.

Next, an exemplary method of reporting allocation information to mobile stations is described.

Allocating distributed resource blocks with consecutive serial numbers, instead of those with separate serial numbers, to a mobiles station makes it possible to reduce the number of control bits used to encode and send allocation information to the mobile station. This approach may also be applied to a case where allocation information for multiple mobile stations is encoded and sent collectively.

Characteristics of all distributed resource blocks are essentially the same. The above method makes it possible to assign resource block numbers to distributed resource blocks such that those numbers do not depend on the characteristics of the distributed resource blocks.

An exemplary method of encoding and sending allocation information for each UE is described below.

Figure 26:
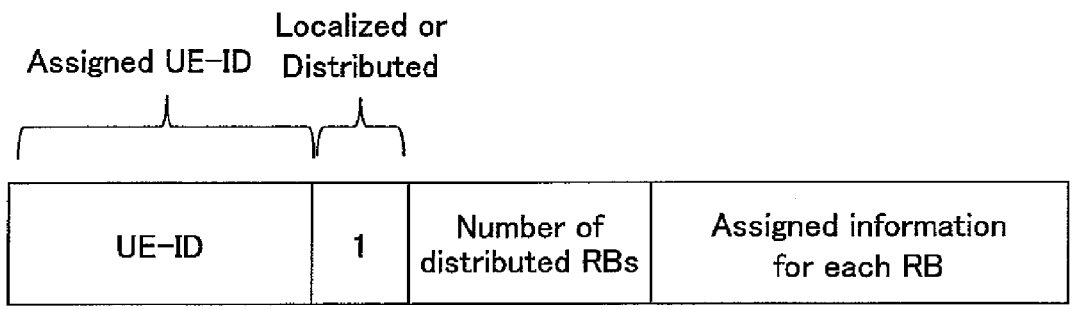
FIG. 26 is a drawing illustrating a method of reporting allocation information in localized and distributed multiplexing.

FIG. 26 shows an example where the division number of each distributed resource block is not predetermined. In this case, allocation information including the division number of each distributed resource block is sent to the mobile station.

The base station sends allocation information that includes the ID (Assigned UE-ID) of a mobile station to which resource blocks are allocated, information indicating whether localized transmission or distributed transmission is applied (Localized or Distributed), the number of distributed resource blocks (Number of Distributed RBs) if distributed transmission is to be applied, and resource block allocation information (Assigned information for each RB). The base station sends control bits representing the allocation information separately to each of the mobile stations to which distributed resource blocks are allocated.

The UE-ID is, for example, represented by 12 bits. In the field for the information indicating whether localized transmission or distributed transmission is applied, "0" is specified for localized transmission and "1" is specified for distributed transmission. Based on the number of distributed resource blocks, the mobile station can determine which localized resource blocks are converted into distributed resource blocks and the division number of each distributed resource block. The "Assigned information for each RB" field stores information indicating distributed resource blocks and information indicating locations of allocated distributed resource blocks.

Using tree based allocation information (see, for example, 3GPP, R1-061308, NEC, "Resource Allocation Signaling for E-UTRA", May 2006) described below makes it possible to reduce the amount of resource block allocation information that indicates allocated distributed resource blocks by a range of consecutive serial numbers assigned to the distributed resource blocks. For example, when the number of resource blocks is 16, the required number of bits is $\log_2(16 \times 17/2)=7$.

Another exemplary method of encoding and sending allocation information for each UE is described below.

Figure 27:
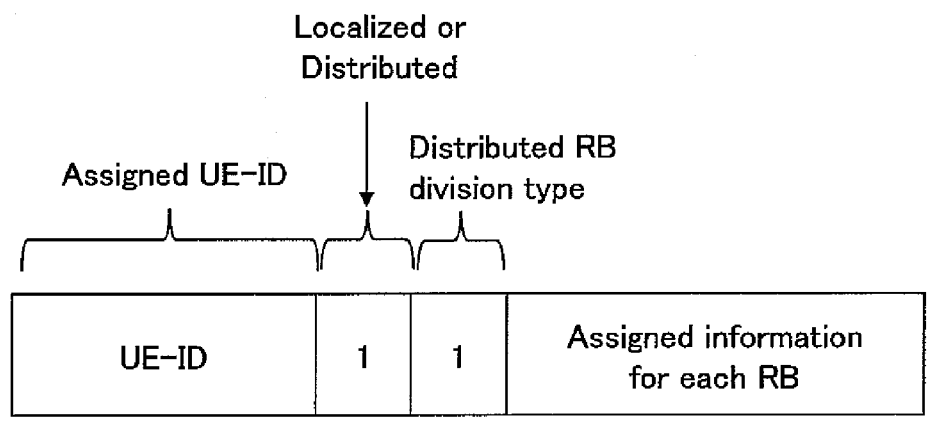
FIG. 27 is a drawing illustrating a method of reporting allocation information in localized and distributed multiplexing.

FIG. 27 shows an example where the division number of each distributed resource block is not predetermined. In this case, allocation information including the division number of each distributed resource block is sent to the mobile station.

The base station sends allocation information that includes the ID (Assigned UE-ID) of a mobile station to which resource blocks are allocated, information indicating whether localized transmission or distributed transmission is applied (Localized or Distributed), a division type of distributed resource blocks (Distributed RB division type) if distributed transmission is to be applied, i.e., information indicating whether the number of distributed resource blocks is an odd number or an even number, and resource block allocation information (Assigned information for each RB). The base station sends control bits representing the allocation information separately to each of the mobile stations to which distributed resource blocks are allocated.

The UE-ID is, for example, represented by 12 bits. In the field for the information indicating whether localized transmission or distributed transmission is applied, for example, "0" is specified for localized transmission and "1" is specified for distributed transmission. In the "Distributed RB division type" field, for example, "0" is specified when the number of distributed resource blocks is an even number and "1" is specified when the number of distributed resource blocks is an odd number. With the division type, the mobile station can determine the dividing pattern of distributed resource blocks and serial numbers of the distributed resource blocks.

The "Assigned information for each RB" field stores information indicating distributed resource blocks and information indicating locations of allocated distributed resource blocks.

As described above, using the tree based allocation information described below makes it possible to reduce the amount of resource block allocation information that indicates allocated distributed resource blocks by a range of consecutive serial numbers assigned to the distributed resource blocks. For example, when the number of resource blocks is 16, the required number of bits is $\log_2(16 \times 17/2)=7$.

Another exemplary method of encoding and sending allocation information for each UE is described below.

Figure 28:
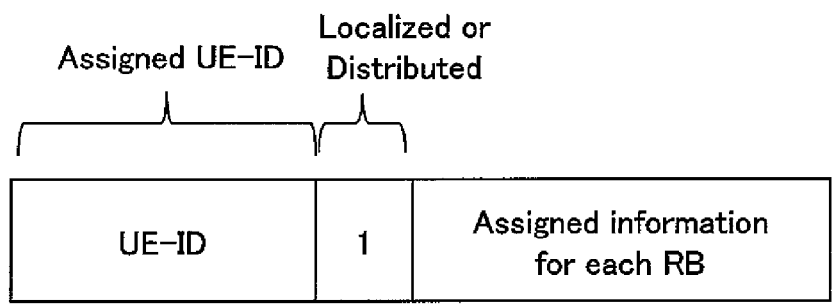
FIG. 28 is a drawing illustrating a method of reporting allocation information in localized and distributed multiplexing.

FIG. 28 shows an example where the division number of each distributed resource block is predetermined.

In this case, the same predetermined division number may be applied to all distributed resource blocks as shown in FIG. 24A or two or more division numbers may be applied to the distributed resource blocks as shown in FIG. 24B.

The base station sends allocation information that includes the ID (Assigned UE-ID) of a mobile station to which resource blocks are allocated, information indicating whether localized transmission or distributed transmission is applied (Localized or Distributed), and resource block allocation information (Assigned information for each RB). The base station sends control bits representing the allocation information separately to each of the mobile stations to which distributed resource blocks are allocated.

The UE-ID is, for example, represented by 12 bits. In the field for the information indicating whether localized transmission or distributed transmission is applied, for example, "0" is specified for localized transmission and "1" is specified for distributed transmission. In this example, the division number of each distributed resource block is predetermined, and the resource block allocation information is represented by tree based allocation information obtained based on the serial numbers assigned to distributed resource blocks as described with reference to FIG. 23B. The mobile station can determine the locations of allocated resource blocks based only on the tree based allocation information.

Figure 29:
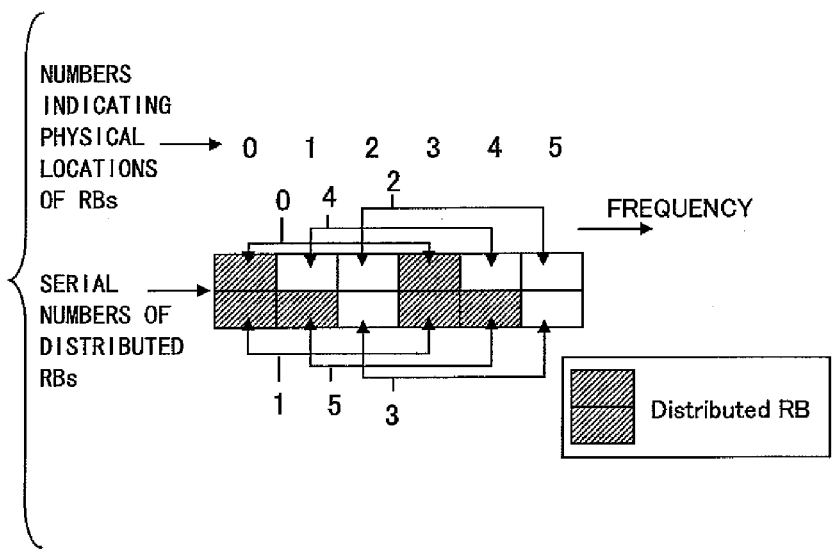
FIG. 29 is a drawing used to describe operations of a frequency scheduling unit of a transmission device according to an embodiment of the present invention.

For example, as shown in FIG. 29, when the number of resource blocks is 6 and distributed resource blocks with consecutive serial numbers 2, 3, and 4 are allocated to a mobile station, the mobile station can determine the locations of the allocated distributed resource blocks based only on the serial numbers 2, 3, and 4.

Next, an exemplary method of reporting allocation information using the tree based allocation information is described.

Figure 30:
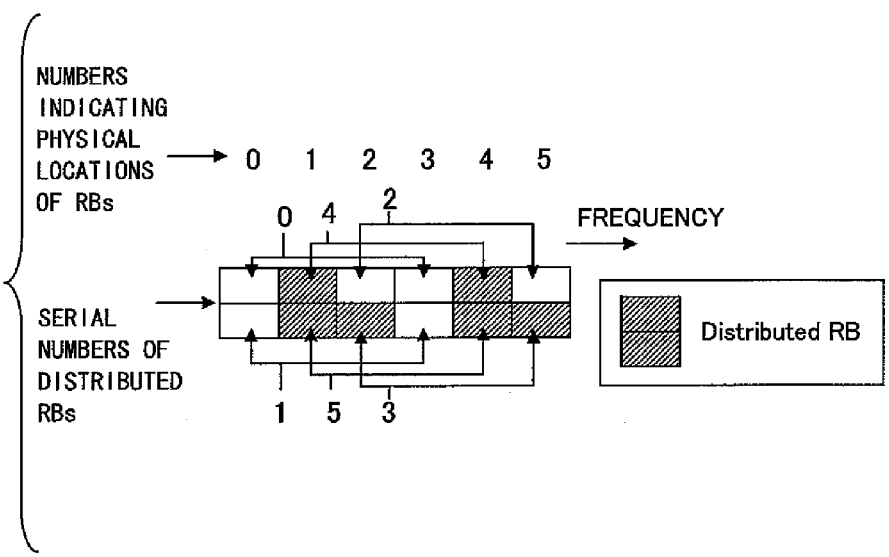
FIG. 30 is a drawing used to describe operations of a frequency scheduling unit of a transmission device according to an embodiment of the present invention.

In the example shown in FIG. 30, it is assumed that the number of resource blocks is 6 and distributed resource blocks with consecutive serial numbers 0, 1, and 2 are allocated to a mobile station.

Figure 31:
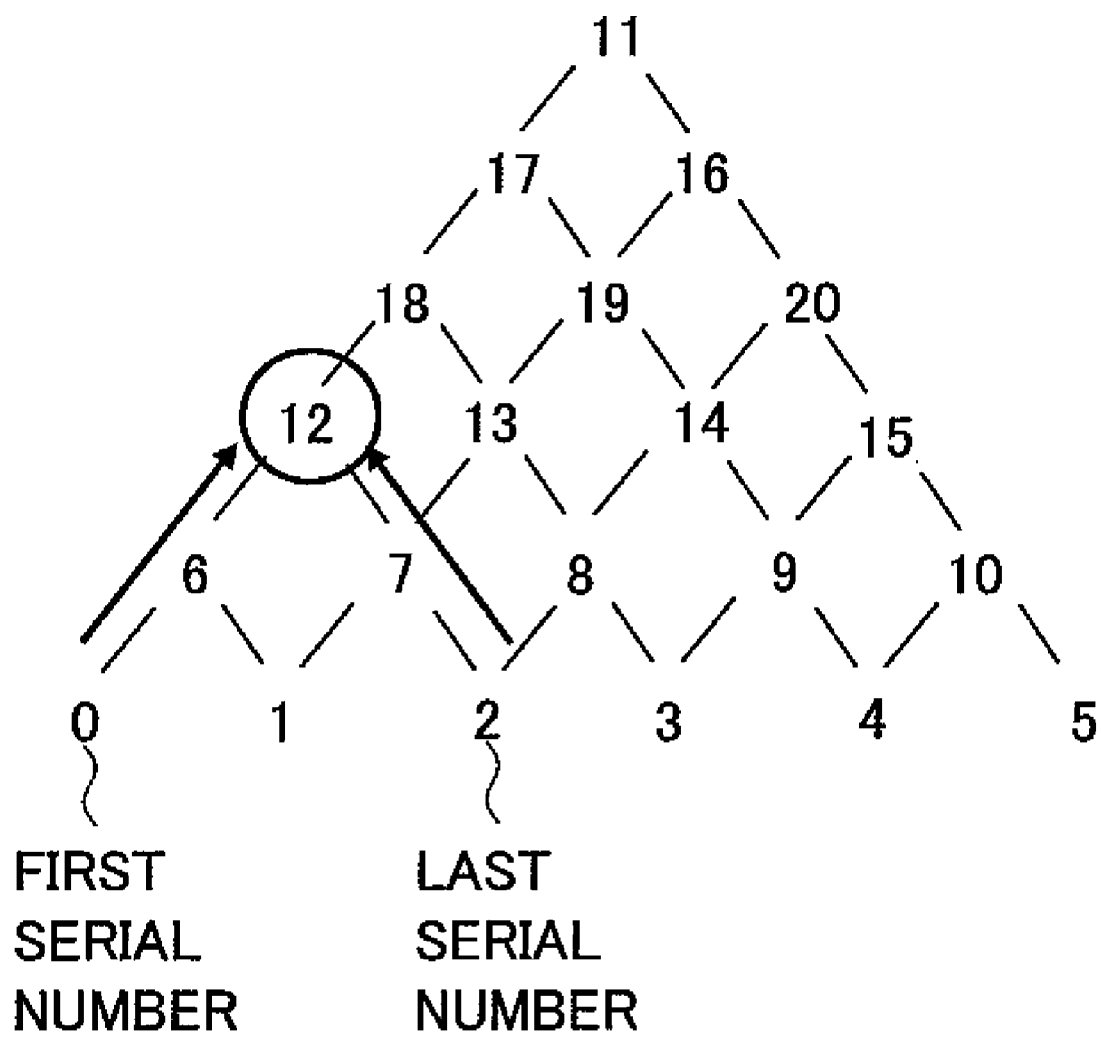
FIG. 31 is a drawing illustrating tree based resource allocation.

In a method using the tree based allocation information, a tree chart as shown in FIG. 31 is used. The base station reports the number (in this example, "12") at an intersection of lines, one extending from each of the first and last serial numbers of allocated resource blocks.

The number of figures necessary to form a tree chart depends on the number of resource blocks (in this example, the number of distributed resource blocks). Specifically, the number of figures necessary to form a tree chart for N resource blocks can be represented by a formula $N \times (N+1)/2$.

Therefore, the number of bits necessary to express resource block allocation information using the tree based allocation information is $\log_2(N \times (N+1)/2)$.

Thus, using the tree based allocation information makes it possible to reduce the amount of resource block allocation information that indicates allocated distributed resource blocks by a range of consecutive serial numbers assigned to the distributed resource blocks.

The present international application claims priority from Japanese Patent Application No. 2006-031742 filed on Feb. 8, 2006, Japanese Patent Application No. 2006-077820 filed on Mar. 20, 2006, and Japanese Patent Application No. 2006-169449 filed on Jun. 19, 2006, the entire contents of which are hereby incorporated herein by reference.

Industrial Applicability

A transmission device and a transmission method according to embodiments of the present invention may be applied to a wireless communication system.

The invention claimed is:

1. A transmission device comprising:
a frequency scheduling unit adapted for a system where a system bandwidth is divided into a plurality of frequency blocks, wherein each of the frequency blocks comprises a plurality of consecutive frequency subcarriers, and
wherein each of the frequency blocks is divided into multiple sub-blocks in a time domain, the frequency scheduling unit being configured to assign a downlink channel to one or more sub-blocks using distributed type transmission or localized type transmission,
wherein distributed type transmission for assigning the downlink channel of one user to multiple sub-blocks that are distribute across at least two of the frequency blocks and consecutive in the time domain and localized type transmission for assigning the downlink channel to a localized frequency block are defined; and
a mapping unit configured to map data of the downlink channel to the sub-blocks assigned by the frequency scheduling unit;
a control information generating unit configured to generate control information regarding the sub-blocks assigned by the frequency scheduling unit to the downlink channel; and
a transmitting unit configured to transmit control information at a head part of the plurality of the frequency blocks,
wherein the control information generating unit generates control information including information indicating whether the localized type transmission or the distributed type transmission is to be performed and allocation information.

2. The transmission device according to claim 1, wherein the frequency scheduling unit assigns the downlink channel to the multiple sub-blocks across at least two of the frequency blocks that are apart from each other according to the number of the frequency blocks in the system bandwidth.

3. The transmission device according to claim 1, further comprising:
an allocation ratio determining unit configured to determine an allocation ratio of the frequency blocks for the localized type transmission to the frequency blocks for the distributed type transmission based on conditions of each mobile station,
wherein the frequency scheduling unit changes the allocation ratio of the frequency blocks for the localized type transmission to the frequency blocks for the distributed type transmission at predetermined intervals based on the determined allocation ratio.

4. The transmission device according to claim 1, wherein the control information generating unit generates control information including the number of identification codes indicating locations of the frequency blocks and the sub-blocks, information indicating all mobile stations to which either the frequency blocks or the sub-blocks are to be assigned, and information indicating the mobile station corresponding to each identification code.

5. The transmission device according to claim 1, wherein the control information generating unit generates control information including the number of identification codes indicating locations of the frequency blocks and the sub-blocks, information indicating a mobile station to which either the frequency blocks or the sub-blocks are to be assigned, and information indicating the mobile station corresponding to each identification code.

6. The transmission device according to claim 1,
wherein the frequency blocks for the localized type transmission and the frequency blocks for the distributed type transmission are assigned codes indicating their locations,
wherein the frequency blocks for the distributed type transmission are positioned apart from each other by the frequency blocks, the number of which are predetermined, based on a division number, and
wherein the control information generating unit assigns information indicating the corresponding locations as identification information to the frequency blocks for the localized type transmission and assigns information indicating the corresponding locations to the frequency blocks for the distributed type transmission based on the codes indicating the locations and the division number.

7. The transmission device according to claim 6, wherein the control information generating unit generates control information including identification information indicating all mobile stations, information indicating the frequency blocks or the sub-blocks, which are assigned according to the identification information indicating all mobile stations, and information indicating the mobile station corresponding to identification codes indicating the locations of the frequency blocks and the sub-blocks.

8. The transmission device according to claim 6, wherein the control information generating unit generates control information including identification information indicating a mobile station, information indicating the frequency blocks or the sub-blocks, which are assigned according to the identification information indicating the mobile station, and information indicating the mobile station corresponding to identification codes indicating the locations of the frequency blocks and the sub-blocks.

9. The transmission device according to claim 1,
wherein the frequency blocks for the localized type transmission and the frequency blocks for the distributed type transmission are assigned codes indicating their locations,
wherein identification codes of the sub-blocks are predetermined according to the number of the frequency blocks for the distributed type transmission, and
wherein the control information generating unit generates control information including identification information indicating a mobile station, information indicating the frequency blocks or the sub-blocks, which are assigned according to the identification information indicating the mobile station, the number of the frequency blocks for the distributed type transmission, and identification codes of the sub-blocks assigned to the mobile station.

10. The transmission device according to claim 9,
wherein the identification codes of the sub-blocks are predetermined differently depending on whether the number of the frequency blocks for the distributed type transmission is odd or even, and
wherein the control information generating unit generates control information including identification information indicating a mobile station, information indicating the frequency blocks or the sub-blocks, which are assigned according to the identification information indicating the mobile station, information indicating whether the number of the frequency blocks for the distributed type transmission is odd or even, and the identification codes of the sub-blocks assigned to the mobile station.

11. The transmission device according to claim 10, wherein the control information generating unit generates a value obtained by applying Tree based Resource Allocation when the sub-blocks of the consecutive identification codes are assigned to the mobile station.

12. The transmission device according to claim 9, wherein the control information generating unit generates a value obtained by applying Tree based Resource Allocation when the sub-blocks of the consecutive identification codes are assigned to the mobile station.

13. The transmission device according to claim 1, wherein the control information generating unit generates a value obtained by applying Tree based Resource Allocation when the sub-blocks of the consecutive identification codes are assigned to the mobile station.

14. A transmission method in a system where a system bandwidth is divided into a plurality of frequency blocks each comprising a plurality of consecutive frequency subcarriers and each of the frequency blocks is divided into multiple sub-blocks in a time domain, comprising the steps of:
assigning a downlink channel to one or more sub-blocks using distributed type transmission or localized type transmission,
wherein distributed type transmission for assigning the downlink channel of one user to multiple sub-blocks that are distribute across at least two of the frequency blocks and consecutive in the time domain and localized type transmission for assigning the downlink channel to a localized frequency block are defined;
mapping data of the downlink channel to the assigned sub-blocks,
generating control information regarding the sub-blocks assigned to the downlink channel in the assigning step; and
transmitting control information at a head part of the plurality of frequency blocks,
wherein control information generated in the generating step includes information indicating whether the localized type transmission of the distributed type transmission is to be performed and allocation information.

15. The transmission method according to claim 14, wherein in the assigning step, the downlink channel is assigned to the multiple sub-blocks across at least two of the frequency blocks that are apart from each other according to the number of the frequency blocks in the system bandwidth.

* * * * *